US008612228B2

(12) United States Patent
Hiraishi

(10) Patent No.: US 8,612,228 B2
(45) Date of Patent: Dec. 17, 2013

(54) CHARACTER MOUTH SHAPE CONTROL METHOD

(75) Inventor: Hiroyuki Hiraishi, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 769 days.

(21) Appl. No.: 12/732,783

(22) Filed: Mar. 26, 2010

(65) Prior Publication Data

US 2010/0250256 A1  Sep. 30, 2010

(30) Foreign Application Priority Data

Mar. 31, 2009  (JP) ................................. 2009-087789

(51) Int. Cl.
G10L 13/00  (2006.01)
G10L 21/00  (2013.01)
G10L 21/06  (2013.01)
G10L 25/00  (2013.01)

(52) U.S. Cl.
USPC ........... 704/261; 704/258; 704/260; 704/270; 704/276

(58) Field of Classification Search
None
See application file for complete search history.

(56) References Cited

U.S. PATENT DOCUMENTS

| | | | | | |
|---|---|---|---|---|---|
| 4,913,539 | A | * | 4/1990 | Lewis ............................. | 352/87 |
| 5,111,409 | A | * | 5/1992 | Gasper et al. ................ | 715/203 |
| 5,121,434 | A | * | 6/1992 | Mrayati et al. ............... | 704/261 |
| 5,278,943 | A | * | 1/1994 | Gasper et al. ................ | 704/200 |
| 5,313,522 | A | * | 5/1994 | Slager ........................... | 704/276 |
| 5,943,648 | A | * | 8/1999 | Tel .............................. | 704/270.1 |
| 6,208,356 | B1 | * | 3/2001 | Breen et al. .................... | 345/473 |
| 6,332,123 | B1 | * | 12/2001 | Kaneko et al. ................ | 704/276 |
| 6,665,643 | B1 | * | 12/2003 | Lande et al. .................. | 704/266 |
| 7,080,015 | B2 | * | 7/2006 | Yamada et al. ............... | 704/275 |
| 7,123,262 | B2 | * | 10/2006 | Francini et al. .............. | 345/473 |
| 7,554,542 | B1 | * | 6/2009 | Ferraro et al. ................ | 345/427 |
| 2004/0030555 | A1 | * | 2/2004 | van Santen ................... | 704/260 |
| 2009/0135176 | A1 | * | 5/2009 | Snoddy et al. ................ | 345/419 |
| 2009/0206993 | A1 | * | 8/2009 | Di Mambro et al. ........ | 340/5.84 |

FOREIGN PATENT DOCUMENTS

JP  A-2003-233389  8/2003
JP  A-2006-065684  3/2006

OTHER PUBLICATIONS

J. P. Lewis , F. I. Parke, Automated lip-synch and speech synthesis for character animation, Proceedings of the SIGCHI/GI conference on Human factors in computing systems and graphics interface, p. 143-147, Apr. 5-9, 1987, Toronto, Ontario, Canada.*
Goto, T.; Kshirsagar, S.; Magnenat-Thalmann, N.; , "Automatic face cloning and animation using real-time facial feature tracking and speech acquisition," Signal Processing Magazine, IEEE , vol. 18, No. 3, pp. 17-25, May 2001.*

* cited by examiner

*Primary Examiner* — Douglas Godbold
*Assistant Examiner* — Michael Ortiz Sanchez
(74) *Attorney, Agent, or Firm* — Oliff & Berridge, PLC

(57) ABSTRACT

A section corresponding to a given duration is sampled from sound data that indicates the voice of a player collected by a microphone, and a vocal tract cross-sectional area function of the sampled section is calculated. The vertical dimension of the mouth is calculated from a throat-side average cross-sectional area of the vocal tract cross-sectional area function, and the area of the mouth is calculated from a mouth-side average cross-sectional area. The transverse dimension of the mouth is calculated from the area of the mouth and the vertical dimension of the mouth.

11 Claims, 22 Drawing Sheets

FIG. 14

| MATCHING DATA 530 | | | | | | |
|---|---|---|---|---|---|---|
| IP ADDRESS 530a | CHARACTER ID 530b | AVATAR ID 530c | AVATAR NAME 530d | PLAYER'S SEX 530e | PLAYER'S AGE 530f | ... |
| IP001 | C1 | AB22 | NABE-MASTER | FEMALE | 25 | ... |
| 0(PLAYER'S DEVICE) | C2 | AB06 | TETSU-KOBUTA | MALE | 19 | ... |
| IP003 | C3 | AB01 | LEADER | MALE | 24 | ... |
| IP004 | C4 | AB12 | RUDOLPH | MALE | 29 | ... |
| IP005 | C5 | AB03 | OYAJI | MALE | 35 | ... |
| IP006 | C6 | AB11 | HANAHANA | FEMALE | 27 | ... |
| ⋮ | ⋮ | ⋮ | ⋮ | ⋮ | ⋮ | ⋮ |

CHARACTER MOUTH SHAPE CONTROL METHOD

Japanese Patent Application No. 2009-87789 filed on Mar. 31, 2009, is hereby incorporated by reference in its entirety.

BACKGROUND

In the field of computer graphics (CG) animation (e.g., game), a chat using an avatar, or a toy, the shape of the mouth of a character is changed when reproducing human voice from a speaker so that the displayed character or the toy character virtually speaks.

Typically, an animator listens to the target voice and determines the shape of the mouth of the character by an empirical rule to provide mouth shape setting data that can be synchronized with reproduction of the voice. This method cannot accurately change the shape of the mouth of the character corresponding to the voice, but can relatively easily change the shape of the mouth of the character in synchronization with reproduction of the voice. Therefore, this method has been employed for game production and TV animation production.

However, such a mouth shape control method does not necessarily implement a satisfactory image quality when used for realistic three-dimensional computer graphics (3DCG) (e.g., movie) or a guide character that is displayed on a guide device used in a museum or the like. Therefore, a mouth shape control method that can accurately change the shape of the mouth of the character corresponding to sound has been desired.

Such a demand may be satisfied by extracting formant information that characterizes a vowel from the reproduction target voice (i.e., identifying the vowel), and selectively outputting a given animation image that is synchronized with the identified vowel to automatically generate an animation image so that the shape of the mouth of the character is changed corresponding to the sound (see JP-A-2003-233389, for example).

A chat system using an avatar that is configured so that a server analyzes voice received from a terminal by voice recognition to determine the shape of the mouth of the avatar that corresponds to the phoneme, and transmits information including the determined shape of the mouth of the avatar to the terminal so that the shape of the mouth of the avatar is accurately displayed on the terminal corresponding to the voice, has also been known (see JP-A-2006-65684, for example).

SUMMARY

According to one aspect of the invention, there is provided a mouth shape control method comprising:
estimating the shape of a vocal tract of a speaker during speaking by analyzing sound data obtained during the speaking;
controlling the shape of a mouth of a character using the estimated shape of the vocal tract; and
displaying the character.

According to another aspect of the invention, there is provided a mouth shape control device comprising:
a vocal tract shape calculation section that estimates the shape of a vocal tract of a speaker during speaking by analyzing sound data obtained during the speaking; and
a mouth shape control section that controls the shape of a mouth of a character using the shape of the vocal tract estimated by the vocal tract shape calculation section.

BRIEF DESCRIPTION OF THE DRAWINGS

FIG. 14 is a view showing a data configuration example of matching data.

DESCRIPTION OF EXEMPLARY EMBODIMENTS

Figure 1:
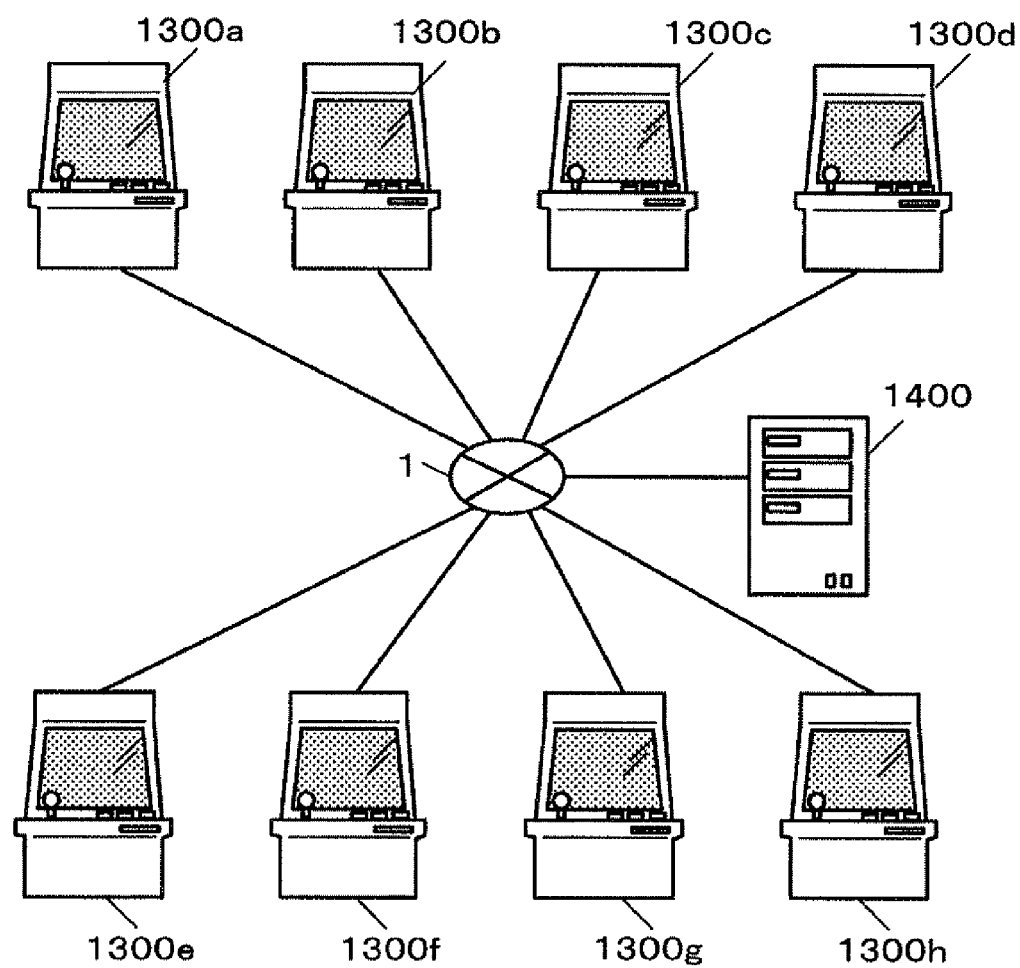
FIG. 1 is a view showing a system configuration example.

When using the method that extracts the formant information or utilizes voice recognition, the calculation load relatively increases. Moreover, a large amount of dictionary data is necessary. Therefore, an applicable system configuration is limited. For example, the above chat system is configured so that a high-performance server determines the mouth shape. However, since such a configuration imposes a high calculation load, it is difficult to apply such a configuration to a game device, a toy, or the like that has a performance lower than that of a server.

Several embodiments of the invention may provide novel technology that implements mouth shape control that enables the shape of the mouth of a character to be highly synchronized and matched with sound with a relatively low calculation load.

According to one embodiment of the invention, there is provided a mouth shape control method comprising:

estimating the shape of a vocal tract of a speaker during speaking by analyzing sound data obtained during the speaking;

controlling the shape of a mouth of a character using the estimated shape of the vocal tract; and displaying the character.

According to another embodiment of the invention, there is provided a mouth shape control device comprising:

a vocal tract shape calculation section that estimates the shape of a vocal tract of a speaker during speaking by analyzing sound data obtained during the speaking; and a mouth shape control section that controls the shape of a mouth of a character using the shape of the vocal tract estimated by the vocal tract shape calculation section.

In the mouth shape control method, the estimating of the shape of the vocal tract may include analyzing the sound data obtained during the speaking to calculate the shape of a vocal tract model.

The term "vocal tract model" used herein refers to a model obtained by simply modeling the human organs involved in voice production (from vocal chords vibrations to voice output).

According to this embodiment, it is possible to implement character mouth shape control that enables the shape of the mouth of the character to be synchronized with reproduction of the sound data and matched with the sound with a relatively low calculation load by calculating the shape of the vocal tract from the sound data that indicates the voice of the speaker.

The mouth shape control method may further comprise:

controlling output of voice based on the sound data; and controlling the shape of the mouth of the character in synchronization with the output voice.

According to this configuration, it is possible to output voice based on the sound data. Moreover, the shape of the mouth of the character can be changed in synchronization with the output voice.

In the mouth shape control method, the estimating of the shape of the vocal tract may include estimating the shape of the vocal tract as a shape that indicates each area of the vocal tract by cross-sectional area; and the controlling of the shape of the mouth of the character may include controlling the shape of the mouth of the character based on the cross-sectional area of each area of the vocal tract.

According to this configuration, since a known vocal tract cross-sectional area function calculation method can be utilized, it is possible to easily implement the method according to the invention. Moreover, the vocal tract model formed using the vocal tract cross-sectional area function has small dependence on the language type, since it is interpreted that a reference sound is output as a given sound. Therefore, it is unnecessary to provide huge dictionary data corresponding to each language type, differing from the case of using voice recognition technology. This makes it possible to easily deal with a voice spoken in a foreign language, for example.

In the mouth shape control method, the controlling of the shape of the mouth of the character may include controlling the shape of the mouth of the character using at least an open area of the vocal tract, a cross-sectional area within a given mouth-side range, and a cross-sectional area within a given throat-side range.

According to this configuration, since the shape of the mouth of the character can be controlled by merely utilizing the cross-sectional area in a given area or a given range, the calculation load can be reduced.

In the mouth shape control method, the controlling of the shape of the mouth of the character may include controlling a vertical dimension of the mouth of the character based on the cross-sectional area within the given throat-side range.

In the mouth shape control method, the controlling of the shape of the mouth of the character may include decreasing the vertical dimension of the mouth of the character as the cross-sectional area within the given throat-side range increases.

This is based on the finding that the cross-sectional area in a given throat-side range has a high correlation with the vertical dimension of the mouth, and the vertical dimension of the mouth decreases as the cross-sectional area increases. This makes it possible to further reduce the calculation load.

In the mouth shape control method, the controlling of the shape of the mouth of the character may include controlling the open area of the mouth of the character based on the cross-sectional area within the given mouth-side range.

This is based on the finding that the cross-sectional area in a given open-side (mouth-side) range has a high correlation with the open area of the mouth. This makes it possible to further reduce the calculation load.

The mouth shape control method may further comprise:

detecting whether or not the sound data indicates sound that corresponds to a fricative, the controlling of the shape of the mouth of the character may include decreasing an open area of the mouth of the character when sound that corresponds to a fricative has been detected as compared with the open area of the mouth of the character when sound that corresponds to a fricative has not been detected.

The mouth shape control method may further comprise:

determining a fricative type when sound that corresponds to a fricative has been detected, the controlling of the shape of the mouth of the character may include controlling the shape of the mouth of the character based on the determined fricative type.

The vocal tract cross-sectional area function is a model that is formulated on the premise that a reference sound produced in the throat-side tract by vibrating the vocal chords is output from the mouth-side tract as a given sound. A fricative is noise produced by forming a narrow area in the vocal tract by bringing the tongue into contact with the roof of the mouth, and quickly expiring through the narrow area. Therefore, it is very difficult to determine the mouth shape that produces a fricative from the cross-sectional area in a given area or a given range of the vocal tract cross-sectional area function. However, a fricative can be distinguished from other types of sound based on the shape of the fricative vocal tract cross-sectional area function.

Therefore, a natural fricative mouth shape can be implemented while utilizing the vocal tract cross-sectional area function by decreasing the open area when a fricative has been detected as compared with the open area when a fricative has not been detected.

The mouth shape control method may further comprise:

detecting whether or not the sound data indicates sound that corresponds to a nasal, the controlling of the shape of the mouth of the character may include decreasing the open area of the mouth of the character when sound that corresponds to a nasal has been detected as compared with the open area of the mouth of the character when sound that corresponds to a nasal has not been detected.

The mouth shape control method may further comprise:

determining a nasal type when sound that corresponds to a nasal has been detected, the controlling of the shape of the mouth of the character may include controlling the shape of the mouth of the character based on the determined nasal type.

The vocal tract cross-sectional area function is a model that is formulated on the premise that a reference sound produced in the throat-side tract by vibrating the vocal chords is output from the mouth-side tract as a given sound. A nasal is a sound pronounced through the nose (i.e., two tracts are substantially necessary). This makes it impossible to directly apply the vocal tract cross-sectional area function. Therefore, it is impossible to determine the mouth shape that produces a nasal from the cross-sectional area in a given area or a given range of the vocal tract cross-sectional area function. However, a nasal can be distinguished from other types of sound based on the shape of the nasal vocal tract cross-sectional area function.

Therefore, a natural nasal mouth shape can be implemented while utilizing the vocal tract cross-sectional area function by decreasing the open area when a nasal has been detected as compared with the open area when a nasal has not been detected.

The mouth shape control method may further comprise:

detecting whether or not the sound data indicates a silent state, the controlling of the shape of the mouth of the character may include gradually decreasing an open area of the mouth of the character as a duration of the silent state increases.

According to this configuration, it is possible to implement mouth shape control that detects a silent state and produces a natural change of human mouth shape (i.e., the mouth is gradually closed after the silent state has continuously occurred).

In the mouth shape control method, the controlling of the shape of the mouth of the character may include suppressing a sudden change of the shape of the mouth of the character so that the shape of the mouth of the character gradually changes.

According to this configuration, it is possible to suppress a sudden change of the shape of the mouth of the character so that a natural change of the shape of the mouth of the character can be expressed.

According to another embodiment of the invention, there is provided a computer-readable information storage medium storing a program that causes a computer to execute one of the above mouth shape control methods.

The term "information storage medium" used herein includes a magnetic disk, an optical disk, an IC memory, and the like.

Exemplary embodiments to which the invention is applied are described below. Note that embodiments to which the invention may be applied are not limited to the following exemplary embodiments.

First Embodiment

A first embodiment to which the invention is applied is described below taking an example of a chat used when a plurality of players are divided into two teams and play an online multi-player game.

System Configuration

FIG. 1 is a view showing a system configuration example according to this embodiment. As shown in FIG. 1, a plurality of arcade game devices 1300 (1300*a* to 1300*h*) are connected via a communication channel 1 (e.g., Internet, local network, private network, or another network, and router) so that the arcade game devices 1300 can exchange data. One player uses one arcade game device 1300. FIG. 1 shows eight arcade game devices 1300 so that eight players (i.e., four players per team) can play the game. Note that the number of arcade game devices 1300 per team may be appropriately set.

The data communication format may also be appropriately set. For example, the data communication may be implemented by a peer-to-peer system after each arcade game device 1300 accesses a matching server 1400 when the game starts and acquires information (e.g., IP address) about other arcade game devices 1300, or may be implemented by a client/server system using the matching server 1400. A known system configuration compliant with an online multi-player game may be appropriately applied.

Configuration of Arcade Game Device

Figure 2:
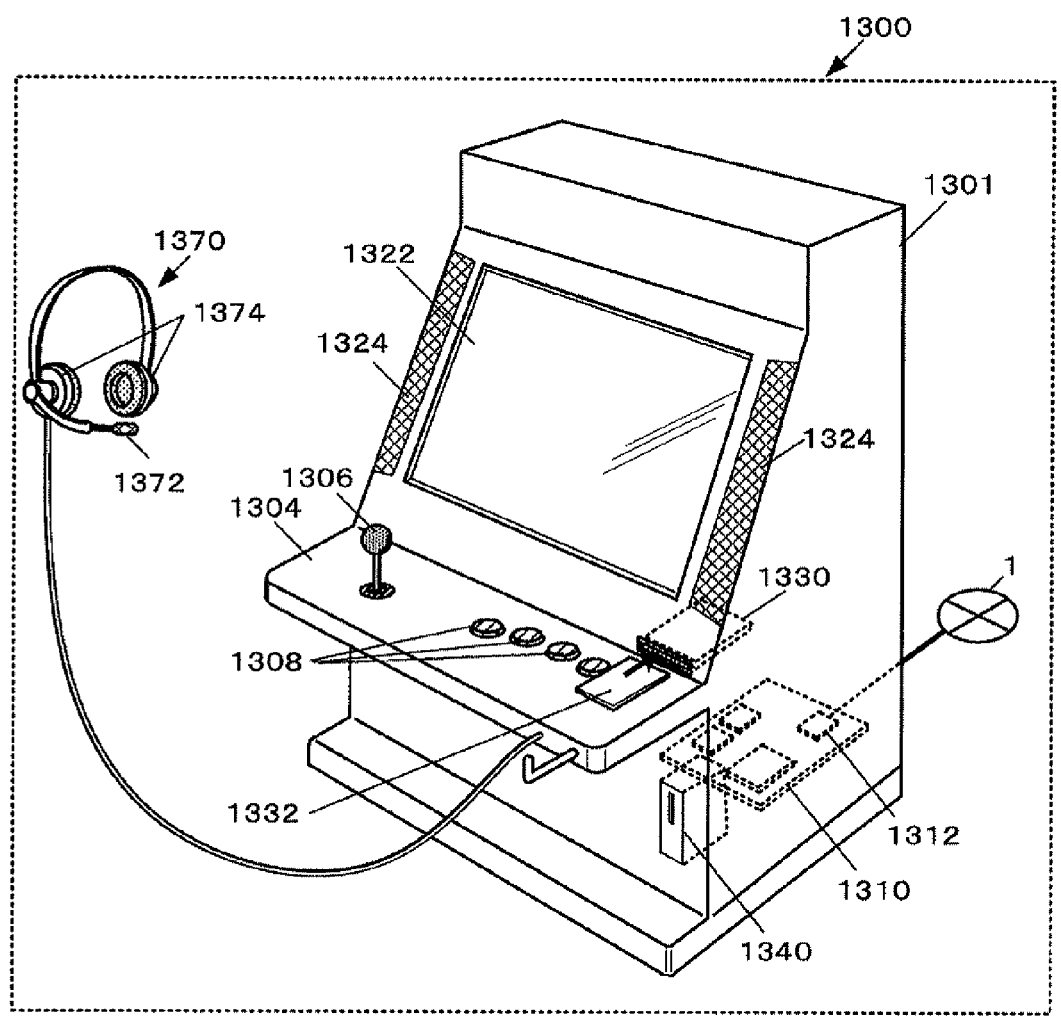
FIG. 2 is a perspective external view showing a configuration example of an arcade game device.

FIG. 2 is a perspective external view showing a configuration example of the arcade game device 1300. The arcade game device 1300 includes a console 1304 that protrudes forward from a game device main body 1301, and input devices (e.g., a joystick 1306 and a plurality of push switches 1308) that are provided on the console 1304 and allow the player to perform an operation input.

A video monitor 1322 (e.g., liquid crystal panel display or CRT) that displays a game image, a speaker 1324 that outputs a game sound and an effect sound, and a game card reader/writer 1330 that reads and writes data from and into a game card 1332 (i.e., portable information storage medium) are provided in the upper area of the game device main body 1301.

A coin counter 1340, a control unit 1310, and a power supply device (not shown) are provided in the lower area or the inner area of the game device main body 1301. The arcade game device 1300 also includes a chat headset 1370 that includes a microphone 1372 and a headphone 1374.

The control unit 1310 (computer board) includes electric/electronic instruments such as a processor (e.g., central processing unit (CPU), graphics processing unit (GPU), and digital signal processor (DSP)), an application-specific integrated circuit (ASIC), and an IC memory. The control unit 1310 includes a communication device 1312 that connects to the communication channel 1 (e.g., Internet, local area network (LAN), or wide area network (WAN)), and implements data communication with an external device (particularly another arcade game device 1300 or the matching server 1400). The control unit 1310 reads a system program and a game program stored in an information storage medium (e.g., IC memory or hard disk), and performs calculations to control each section of the arcade game device 1300.

When the player desires to play the online multi-player game using the arcade game device 1300, the player must register himself and obtain the game card 1332 that stores player information (e.g., handle name and the type of character used) in the same manner as a known online multi-player game.

When the player plays the online multi-player game, the player inserts the game card 1332 into the game card reader/writer 1330 of the arcade game device 1300 so that the game card reader/writer 1330 reads the player information stored in the game card 1332. A dedicated registration device that is provided separately from the arcade game device 1300 or the arcade game device 1300 may receive player registration and issue the game card 1332. Note that the matching server 1400 stores and manages the player registration information.

When the coin counter 1340 has detected that a coin corresponding to a predetermined amount has been inserted, the control unit 1310 reads and executes the game program so that the arcade game device 1300 functions as a game device that implements the invention and a mouth shape-voice synchronization control device to which the invention is applied.

When the arcade game device 1300 starts the game, the arcade game device 1300 reads the player information from the player's game card 1332 through the game card reader/writer 1330. The arcade game device 1300 then accesses the matching server 1400 and performs a matching process in the same manner as a known online multi-player game to acquire data transmission destination information (e.g., IP address) and player information about another arcade game device 1300 that participates in the online multi-player game (hereinafter may be simply referred to as "another game device"). The arcade game device 1300 transmits an operation input code based on an operation input performed using the joystick 1306 or the push switch 1308 and sound data that indicates the voice of the player (speaker) collected by the microphone 1372 of the headset 1370 to another game device in a given cycle, and receives an operation input code and sound data transmitted from another game device.

The arcade game device 1300 controls the movement of a player's character that is disposed in a game space formed in a virtual three-dimensional space based on the operation input code received from another game device and the operation input code based on the operation input performed using the arcade game device 1300, for example. The arcade game device 1300 generates a game screen (image) photographed using a virtual camera, and generates a game sound (e.g., background music (BGM) or effect sound) at an appropriate timing.

The generated game screen is displayed on the video monitor 1322, and the generated game sound is output from the speaker 1324. The player plays the game while watching the game screen displayed on the video monitor 1322 and listening to the game sound output from the speaker 1324.

When the arcade game device 1300 has received the sound data, the arcade game device 1300 displays an image (game screen) that indicates the face of an avatar selected by the player (i.e., speaker) while reproducing the sound data so that the sound is output from the speaker 1324.

Outline of Game

Figure 3:
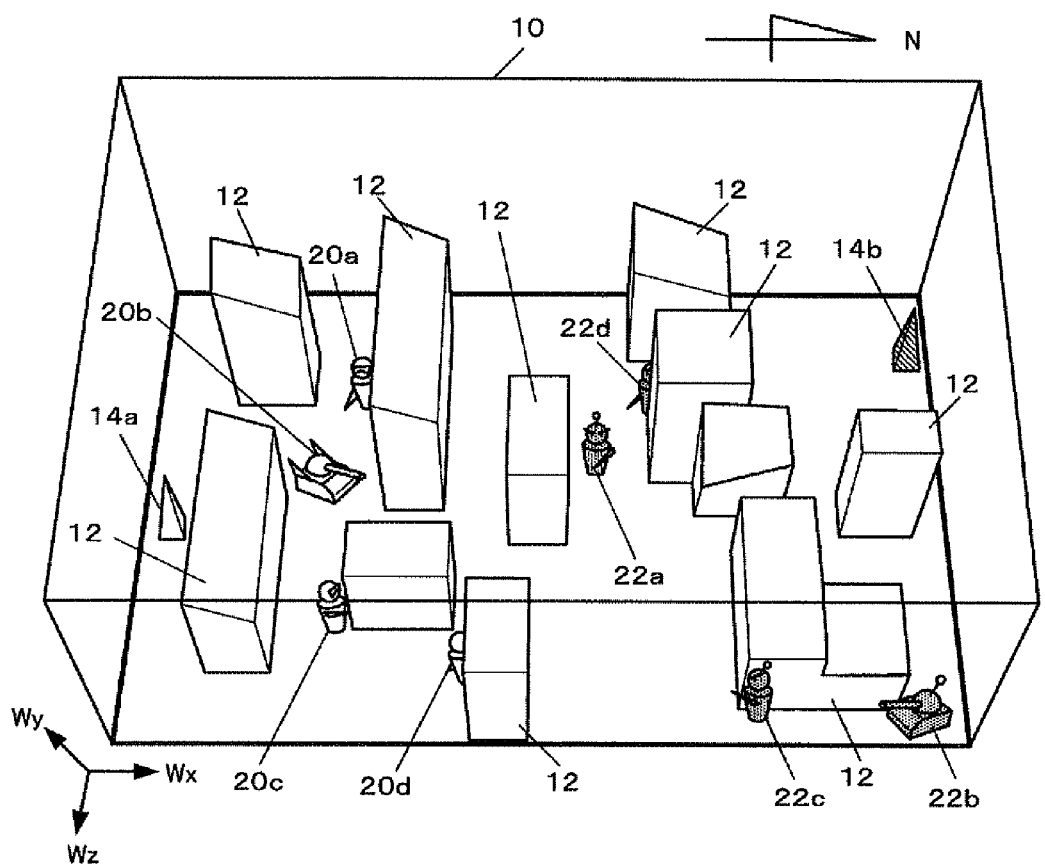
FIG. 3 is a view illustrative of an outline of an online multi-player game.

FIG. 3 is a view illustrative of an outline of the online multi-player game according to this embodiment. In the online multi-player game according to this embodiment, each team (group) is formed by four players, and two teams fight against each other in a game space 10 using a weapon (e.g., firearm).

As shown in FIG. 3, the game space 10 is a rectangular parallelepiped area that virtually extends from north to south. Obstacles 12 are disposed in various places, and team bases 14*a* and 14*b* are respectively disposed on the south end and the north end, for example. One of the teams is formed by four player's characters 20*a*, 20*b*, 20*c*, and 20*d* including a tank, and the other team is formed by four player's characters 22*a*, 22*b*, 22*c*, and 22*d* including a tank. Each player's character corresponds to the player who plays the game using one of the arcade game devices 1300, and is controlled based on an operation input performed by the corresponding player.

Figure 4:
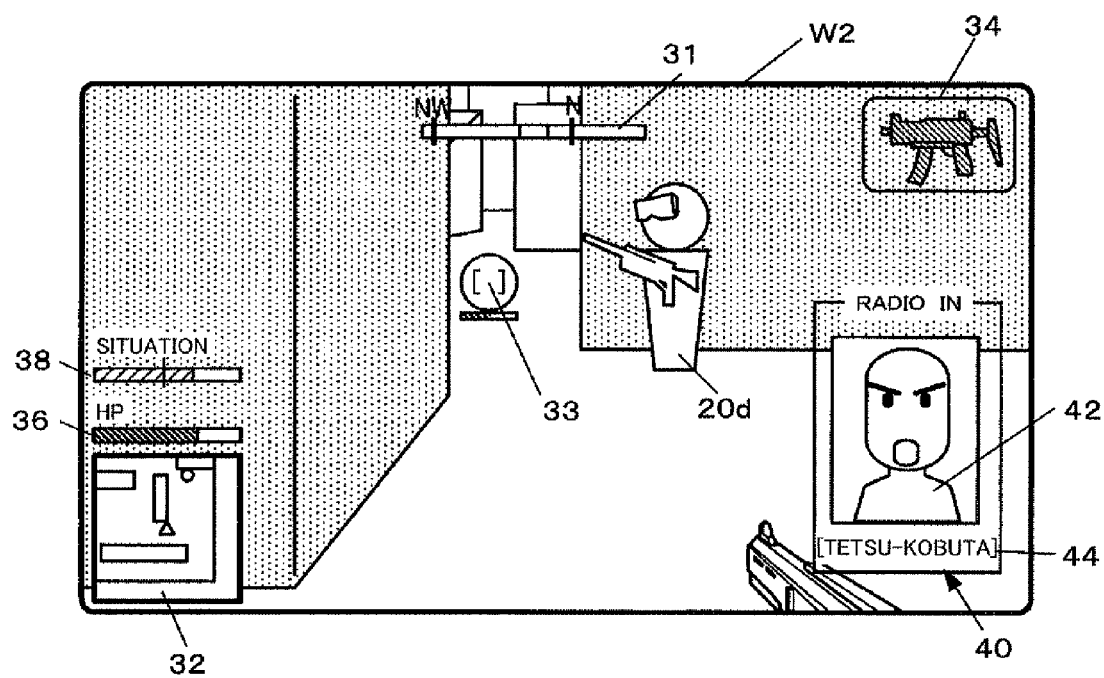
FIG. 4 is a view showing an example of a game screen of an online multi-player game.

FIG. 4 is a view showing an example of a game screen of the online multi-player game according to this embodiment. A game screen W2 displayed on each arcade game device 1300 is drawn from the first person point of view of the player's character that corresponds to each game device.

A direction indicator 31, a map display section 32, a sight mark 33, a selected weapon display section 34, a hit point gauge 36, a situation index display section 38, and a chat screen 40 are displayed within the game screen.

The hit point gauge 36 indicates the current hit point of the player's character. The player's character cannot take part in a battle when the hit point has reached "0".

The situation index display section 38 indicates the situation of the player's team and the opposing team by means of a bar. The player's team is superior to the opposing team when the end of the bar is positioned on the right side with respect to the center, and is inferior to the opposing team when the end of the bar is positioned on the left side with respect to the center. Known team match game technology may be appropriately applied to the situation index. For example, the index of each team is calculated according to a given rule (e.g., the index increases as the total hit point of the player's characters increases, and decreases as the number of player's characters that cannot take part in a battle increases), and the situation index is calculated based on the ratio of the index of each team thus calculated.

The player moves the player's character while chatting with another player of the player's team, and shoots the player's character or the base of the opposing team while setting the sight mark 33 displayed within the screen on the player's character or the base of the opposing team positioned within the field of view. A team for which all of the player's characters cannot take part in a battle or the base has been destroyed loses the game.

The chat screen 40 is a sub-screen displayed within the game screen when the player chats with another player. The front image of an avatar 42 that represents the player (speaker) who has input the sound data received from another game device, and an avatar name 44 are displayed within the chat screen 40. The expression of the avatar 42 including the mouth is changed (animated) so that the avatar 42 speaks based on the chat sound data in synchronization with reproduction of the chat sound data.

Principle of Avatar Mouth Shape Control

Figure 5:
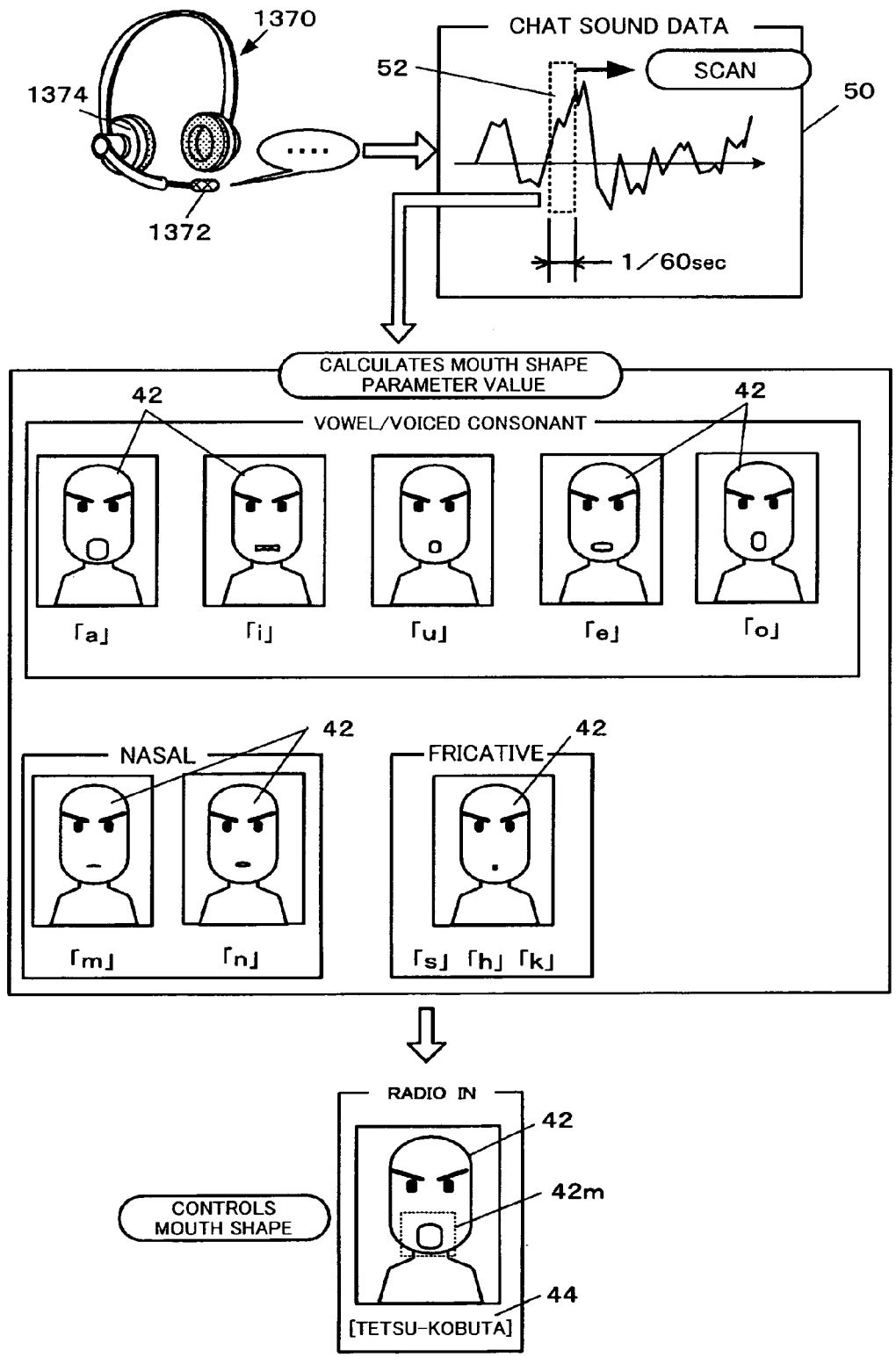
FIG. 5 is a schematic view illustrative of an outline of the avatar mouth shape control principle.

FIG. 5 is a view illustrative of an outline of the principle of controlling the shape of the mouth of the avatar 42 according to this embodiment. When the player has input a given chat start operation and spoken into the microphone 1372 of the headset 1370, the voice of the player is transmitted to another game device as sound data 50, and stored therein as identical sound data. The sound data 50 is used to control the shape of the mouth of the avatar 42.

The sound data 50 received from another game device is sequentially sampled by a given duration (e.g., 1/60th of a second), and a mouth shape parameter value used to control the shape of the mouth of the avatar 42 is calculated corresponding to each sampled section 52.

In this embodiment, the mouth shape parameter value is calculated based on a vowel/voiced consonant setting, a nasal setting, or a fricative setting. One of the vowel/voiced consonant setting, the nasal setting, and the fricative setting is selected, and a specific mouth shape parameter value is calculated based on the selected setting.

At least a mouth 42*m* (i.e., an area that changes in shape when the avatar speaks) of the model of the avatar 42 is controlled based on the calculated mouth shape parameter value. An image of the avatar 42 photographed from the front using a virtual camera is rendered, and displayed within the chat screen 40 as the front image. Specifically, since the shape of the mouth of the avatar 42 is determined and controlled based on the sound data 50 that indicates the voice of the player, it is possible to display the chat screen 40 as if the avatar 42 actually spoke instead of lip-syncing.

Figure 6:
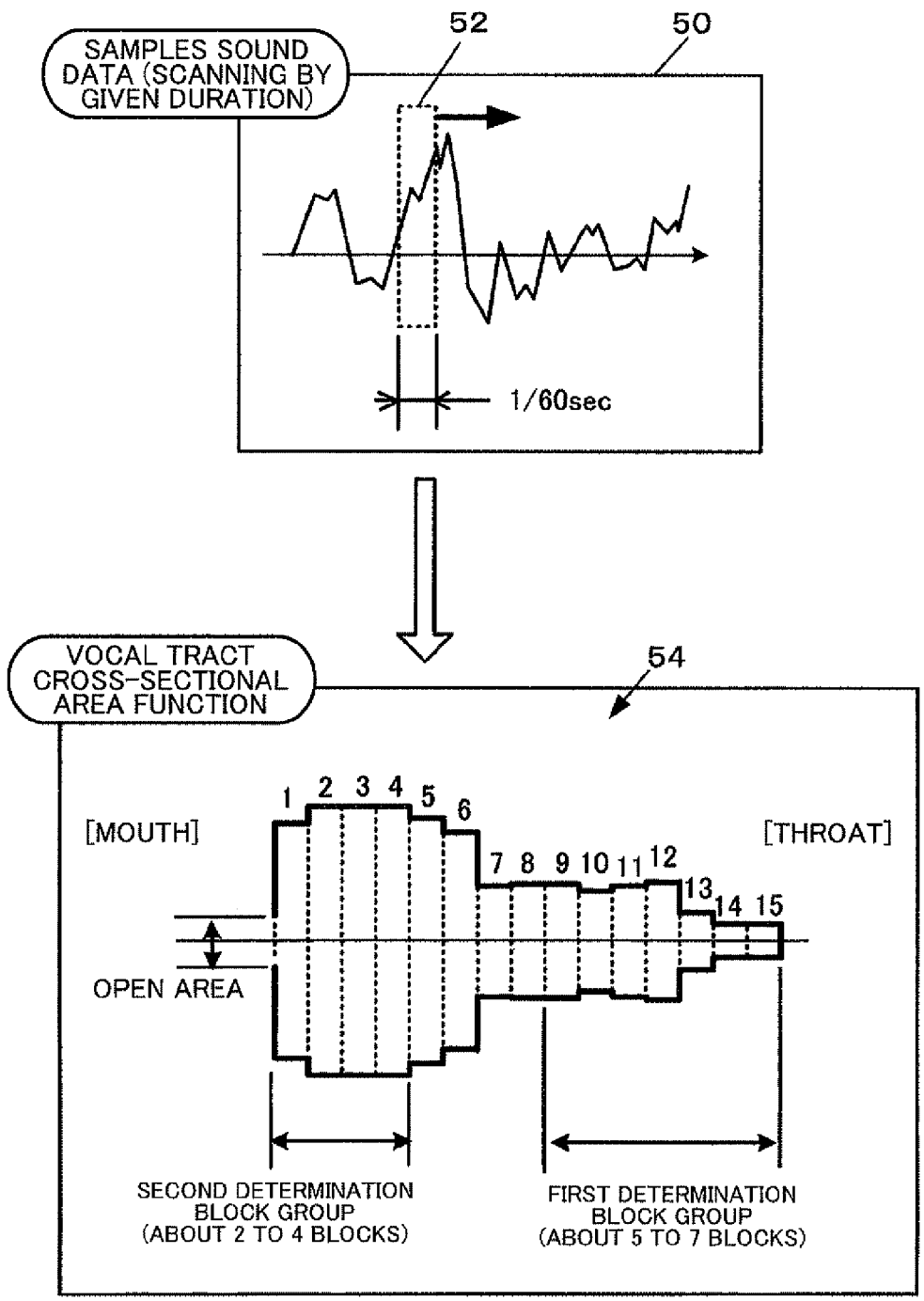
FIG. 6 is a view illustrative of the principle of calculating a mouth shape parameter value.

FIGS. 6 to 9 are views illustrative of a specific principle of calculating the mouth shape parameter value. The mouth shape parameter value is calculated as follows. As shown in FIG. 6, the sound data 50 is scanned, and a vocal tract cross-sectional area function 54 that estimates and models the vocal tract shape of the player during speaking is calculated corresponding to each section 52 of the scanned sound data 50. The vocal tract cross-sectional area function 54 may be calculated by appropriately utilizing a known method.

The calculated vocal tract cross-sectional area function 54 is divided into a plurality of blocks (e.g., about 12 to 25 blocks; 15 blocks in the example shown in FIG. 6) from the mouth to the throat, and the vertical dimension of the mouth (i.e., mouth shape parameter value) is calculated based on the cross-sectional profile of a first determination block group (about 5 to 7 blocks from the throat). The area of the mouth is calculated based on the cross-sectional profile of a second determination block group (about 2 to 4 blocks from the mouth), and the transverse dimension of the mouth is calculated from the area and the vertical dimension of the mouth. Whether or not a nasal has been produced is also determined based on the mouth-side open cross-sectional area of the vocal tract cross-sectional area function 54.

Note that the total number of blocks into which the vocal tract cross-sectional area function 54 is divided, the number of blocks that form the first determination block group, and the number of blocks that form the second determination block group are appropriately determined depending on the combination of the player's race, sex, age, and the like.

Figure 7:
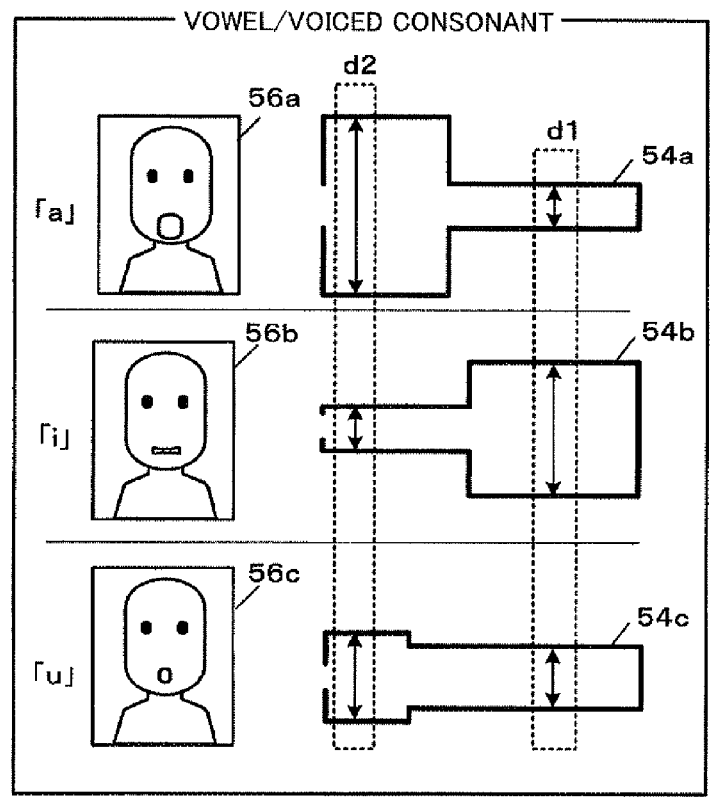
FIG. 7 is a view illustrative of the principle of calculating a vowel/voiced consonant mouth shape parameter value from a vocal tract cross-sectional area function.
Figure 7:
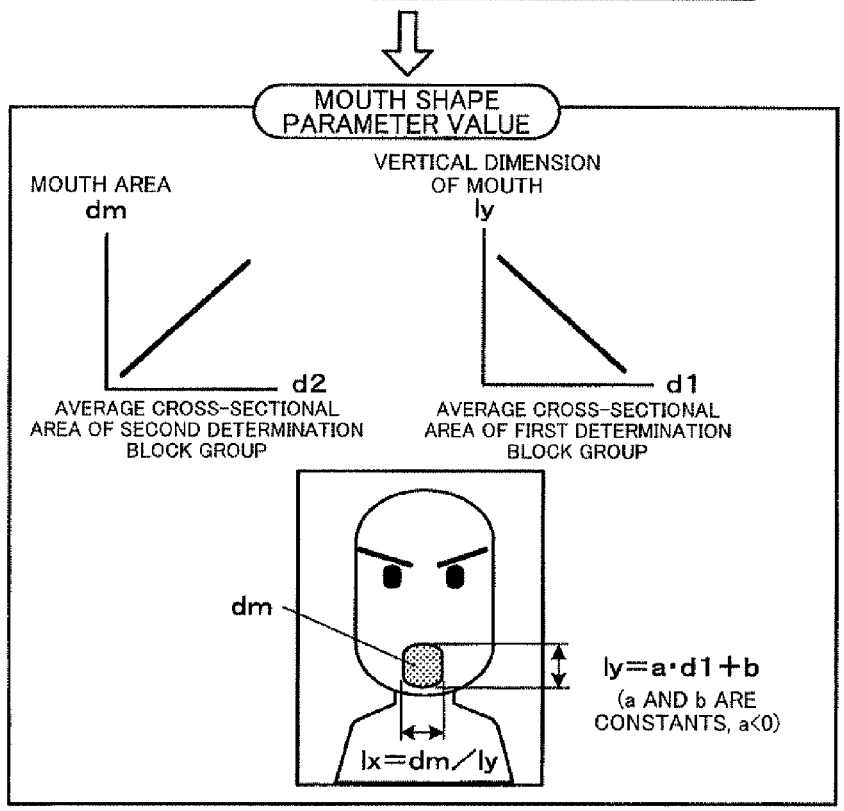

FIG. 7 is a view illustrative of the principle of calculating the vowel/voiced consonant mouth shape parameter value from the vocal tract cross-sectional area function. FIG. 7 shows a representative example of a vowel/voiced consonant. Note that the shape of the vocal tract cross-sectional area function 54 (54a, 54b, 54c) is simplified so that the features of actual human voice are easily understood.

A human vocal tract is configured so that the area of the throat decreases when the mouth is wide open vertically. As shown in FIG. 7, the vertical dimension of the mouth decreases as the average cross-sectional area d1 of the first determination block group increases (see representative examples "a", "i", and "u" of actual human voice, a mouth shape 56 (56a, 56b, 56c), and the vocal tract cross-sectional area function 54 (54a, 54b, 54c)). The area dm of the mouth increases as the average cross-sectional area d2 of the second determination block group increases.

A function that estimates the vertical dimension 1y of the mouth from the average cross-sectional area d1 that corresponds to the cross-sectional area of the throat can be set by utilizing the above features. In this embodiment, the vertical dimension 1y of the mouth is calculated using a given function that defines that the vertical dimension 1y decreases as the average cross-sectional area d1 increases. In the example shown in FIG. 7, the given function is a linear function that slopes downward from left to right in an orthogonal coordinate system in which the X axis indicates the average cross-sectional area d1 and the Y axis indicates the vertical dimension 1y of the mouth. Note that the given function is not limited to a linear function insofar as the function slopes downward from left to right.

The transverse dimension 1x of the mouth can be estimated from the average cross-sectional area d2 that corresponds to the cross-sectional area of the mouth and the vertical dimension 1y of the mouth. In this embodiment, the area dm of the mouth is calculated using a given function that defines that that the open area dm increases as the average cross-sectional area d2 increases, and the transverse dimension 1x (=dm/1y) of the mouth is calculated from the open area dm and the vertical dimension 1y of the mouth. In the example shown in FIG. 7, the given function is a linear function that slopes upward from left to right in an orthogonal coordinate system in which the X axis indicates the average cross-sectional area d2 and the Y axis indicates the area dm of mouth. Note that the given function is not limited to a linear function insofar as the function slopes upward from left to right. When the average cross-sectional area d2 and the area dm of the mouth have a linear relationship (see FIG. 7), the transverse dimension 1x of the mouth may be calculated by "1x=k·d2/1y (k is a coefficient)".

Figure 8:
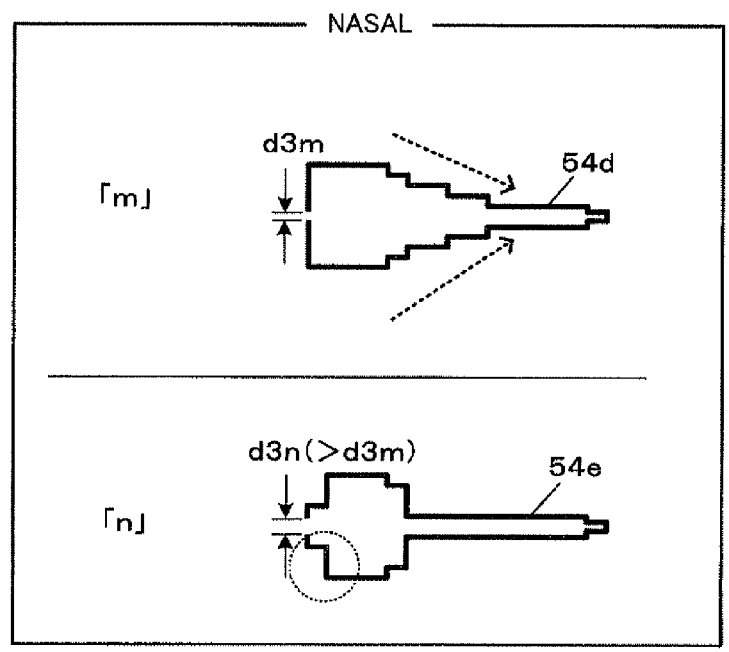
FIG. 8 is a view illustrative of the principle of calculating a nasal mouth shape parameter value from a vocal tract cross-sectional area function.
Figure 8:
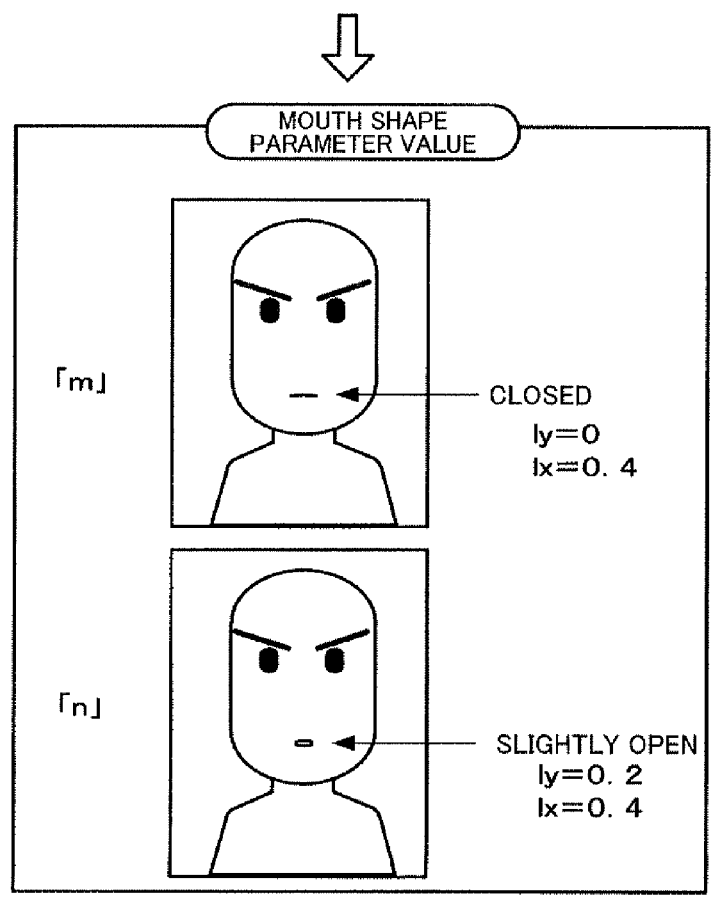

FIG. 8 is a view illustrative of the principle of calculating the nasal mouth shape parameter value from the vocal tract cross-sectional area function. FIG. 8 shows representative examples "m" and "n" of a nasal. Note that the shape of the vocal tract cross-sectional area function 54 (54d, 54e) is simplified so that the features of actual human voice are easily understood.

A nasal is a sound pronounced through the nose. In this case, it is impossible to treat the vocal tract cross-sectional area function in the same way as a sound pronounced through the mouth. However, a vocal tract cross-sectional area function actually calculated from a nasal has a feature in which an open area d3 (d3m, d3n) decreases as compared with that of a vowel/voiced consonant. In this embodiment, whether or not the sound corresponding to the section 52 sampled from the sound data 50 is a nasal is determined depending on the presence or absence of the above feature.

The open area d3 when producing a nasal "m" tends to be smaller than that when producing a nasal "n". Therefore, it is determined that a nasal "m" has been produced when the open area d3 is smaller than a given reference value, and it is determined that a nasal "n" has been produced when the open area d3 is larger than the reference value.

When producing a nasal "m", the cross-sectional area of each block set using the vocal tract cross-sectional area function gradually decreases from the mouth to the throat as compared with the case of producing a nasal "n". This feature may be utilized as the determination condition. When focusing on about five blocks from the mouth, the cross-sectional area of the first block or the first and second blocks closer to the mouth is smaller than that of the remaining blocks when producing a nasal "n" (see the area of the vocal tract cross-sectional area function 54e enclosed by a broken line). This feature may be utilized as the determination condition.

When the player has produced a nasal "m", the mouth shape parameter value is determined so that the mouth is closed. When the player has produced a nasal "n", the mouth shape parameter value is determined so that the mouth is slightly open. For example, when the mouth shape parameter value is indicated by 0 (closed) to 1.0 (open to a maximum extent), the vertical dimension 1y of the mouth is set to about 0.2, and the transverse dimension 1x of the mouth is set to about 0.4.

Figure 9:
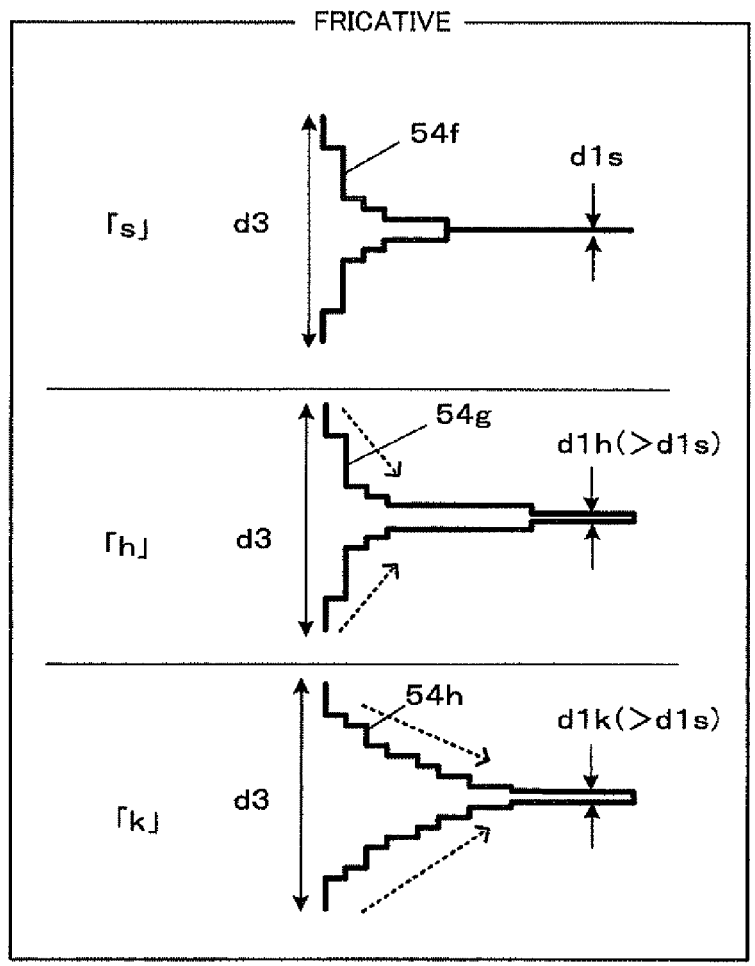
FIG. 9 is a view illustrative of the principle of calculating a fricative mouth shape parameter value from a vocal tract cross-sectional area function.
Figure 9:
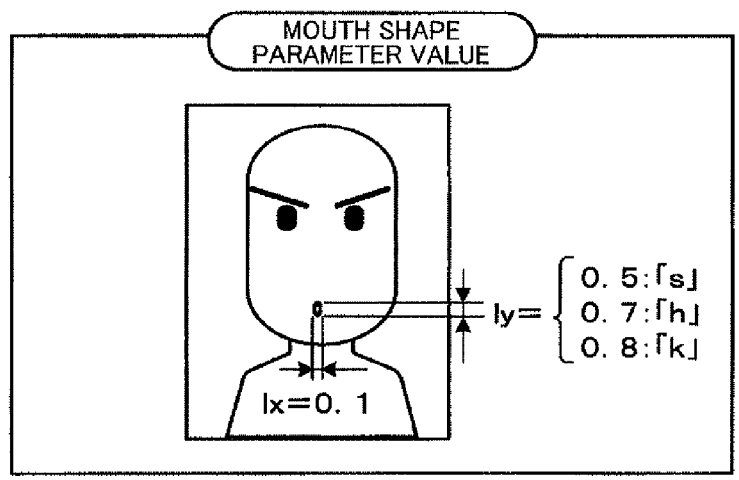

FIG. 9 is a view illustrative of the principle of calculating the fricative mouth shape parameter value from the vocal tract cross-sectional area function 54. FIG. 9 shows representative examples "s", "h", and "k" of a fricative. Note that the shape of the vocal tract cross-sectional area function 54 (54f, 54g, 54h) is simplified so that the features of actual human voice are easily understood.

A fricative is a kind of noise produced by forming a narrow area in the vocal tract by bringing the tongue into contact with the roof of the mouth, and quickly expiring through the narrow area. In this embodiment, whether or not a fricative has been produced is determined by utilizing the features in which the open area d3 of the vocal tract cross-sectional area function when producing a fricative is significantly larger than that when producing a vowel/voiced consonant, and the average cross-sectional area coefficient d1 of the throat when producing a fricative is significantly smaller than that when producing a vowel/voiced consonant.

It is determined that a fricative "s" has been produced when the average cross-sectional area coefficient d1 is smaller than a given reference value. When the average cross-sectional area coefficient d1 is larger than the reference value, it is determined that a fricative "h" has been produced when the degree of decrease in vocal tract cross-sectional area (vocal tract cross-sectional area decrease rate) within several blocks from the mouth (indicated by a broken arrow in FIG. 9) is smaller than a given reference value (i.e., the vocal tract cross-sectional area decreases rapidly), otherwise it is determined that a fricative "k" has been produced.

A given mouth shape parameter value is provided in advance corresponding to each fricative. Specifically, when the mouth shape parameter value is indicated by 0 (closed) to 1.0 (open to a maximum extent), the transverse dimension $1x$ of the mouth is set to about 0.1, and the vertical dimension $1y$ of the mouth is set to about 0.5 (fricative "s"), about 0.7 (fricative "h"), or about 0.8 (fricative "k").

Functional Blocks

A functional configuration is described below.

Figure 10:
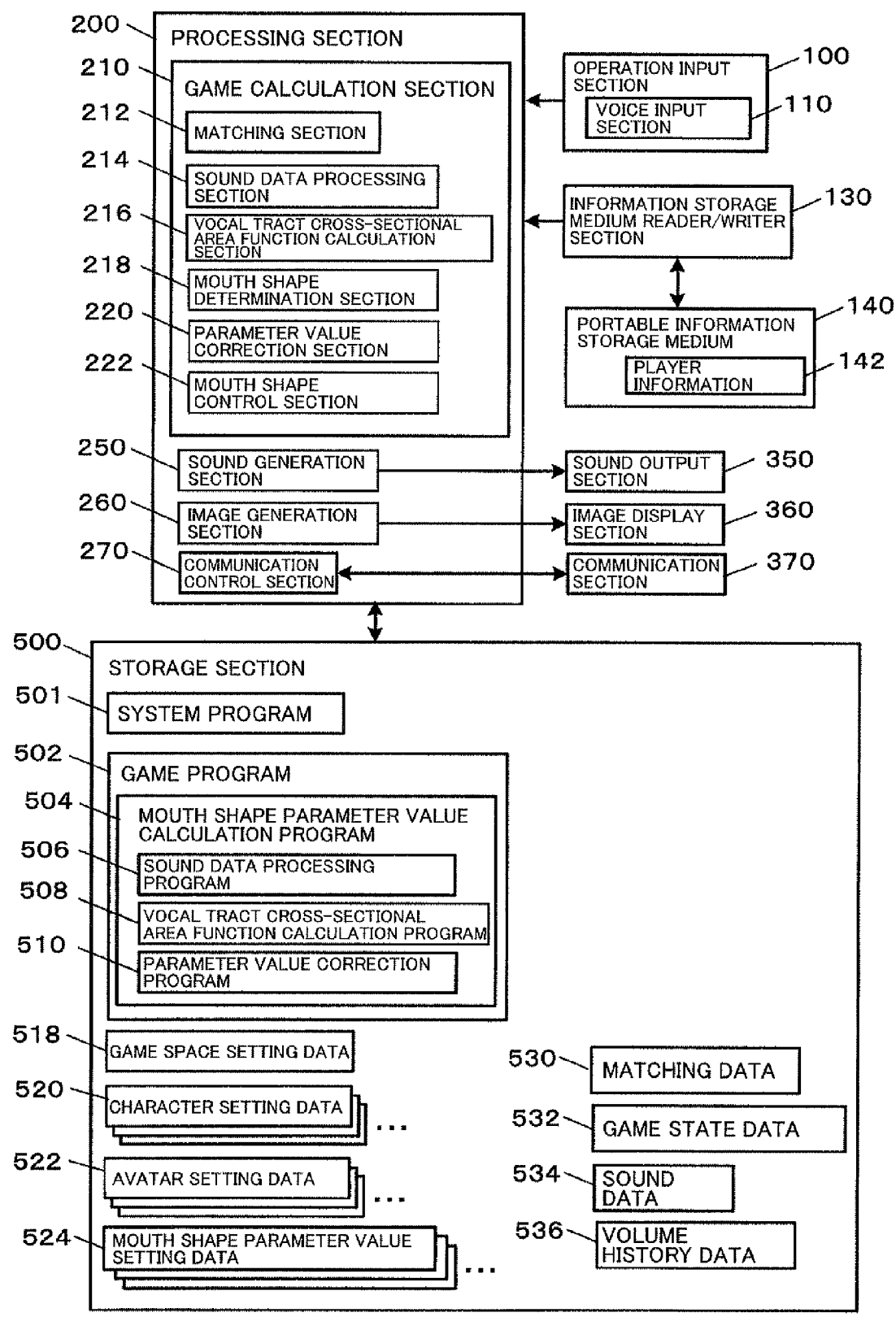
FIG. 10 is a functional block diagram showing a functional configuration example according to a first embodiment.

FIG. 10 is a functional block diagram showing an example of the functional configuration according to this embodiment. The arcade game device 1300 according to this embodiment includes an operation input section 100, an information storage medium reader/writer section 130, a processing section 200, a sound output section 350, an image display section 360, a communication section 370, and a storage section 500.

The operation input section 100 outputs an operation input signal to the processing section 200 based on an operation input performed by the player. In this embodiment, the operation input section 100 includes a voice input section 110. In FIG. 2, the joystick 1306, the push switch 1308, and the microphone 1372 of the headset 1370 (corresponding to the voice input section 110) correspond to the operation input section 100.

The information storage medium reader/writer section 130 reads and writes data from and into a portable information storage medium 140 (external storage medium) that stores player information 142 and the like. In FIG. 2, the game card reader/writer 1330 corresponds to the information storage medium reader/writer section 130. For example, the information storage medium reader/writer section 130 is implemented by a magnetic card reader/writer when the game card 1332 (portable information storage medium 140) is a magnetic card, and is implemented by an IC card reader/writer when the game card 1332 is an IC card.

Figure 11:
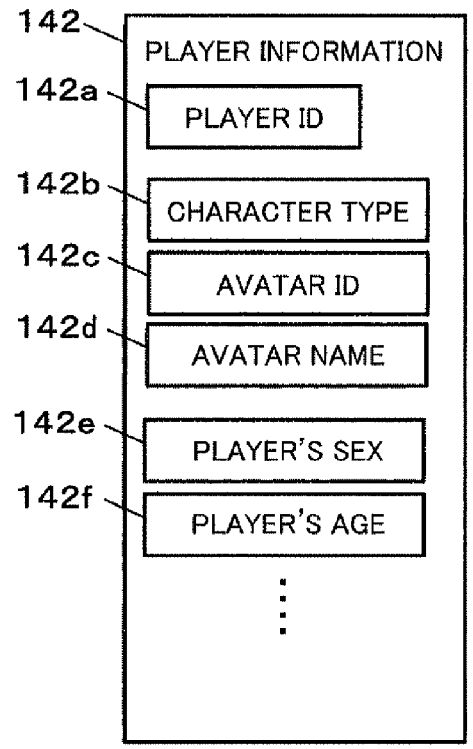
FIG. 11 is a view showing a data configuration example of player information.

As shown in FIG. 11, the player information 142 includes a player ID 142a, a character type 142b that indicates the type of the aplayer's character, an avatar ID 142c that indicates the type of avatar 42 that represents the player and is displayed within the chat screen 40 (see FIG. 4), and an avatar name 142d that is determined in advance by the player, for example.

The player information 142 also includes a player's sex 142e and a player's age 142f as the information about the player. The race, dialect type, and the like may also be set as the information about the player. It is also possible to appropriately store information about the play record and the like in the same manner as in a known online multi-player game.

The player information 142 is managed in the same manner as in a known online multi-player game.

The processing section 200 is implemented by electronic components such as a microprocessor, an application specific integrated circuit (ASIC), and an IC memory. The processing section 200 exchanges data with each functional section including the operation input section 100 and the storage section 500, and controls the operation of the arcade game device 1300 by performing calculations based on a given program, data, and the operation input signal from the operation input section 100. In FIG. 2, the control unit 1310 provided in the game device main body 1301 corresponds to the processing section 200.

The processing section 200 according to this embodiment includes a game calculation section 210, a sound generation section 250, an image generation section 260, and a communication control section 270.

The game calculation section 210 executes a game process. For example, the game calculation section 210 executes a matching process before the game starts, transmits the operation input code based on the operation input from the operation input section 100 to another game device, forms the game space in the virtual three-dimensional space, controls the operations of characters that are operated by the player and another player and disposed in the virtual three-dimensional space, sequentially transmits the chat voice sound data to another game device, controls display of the chat screen 40, and controls the model of the avatar. The game calculation section 210 also performs a hit determination process and a physical calculation process, calculates the situation index that indicates the situation of each team, and generates each element (e.g., direction indicator 31, map display section 32, hit point gauge 36, and situation index display section 38 shown in FIG. 4) that forms the game screen (e.g., radar screen).

The game calculation section 210 according to this embodiment includes a matching section 212, a sound data processing section 214, a vocal tract cross-sectional area function calculation section 216, a mouth shape determination section 218, a parameter value correction section 220, and a mouth shape control section 222. The sound data processing section 214, the vocal tract cross-sectional area function calculation section 216, the mouth shape determination section 218, and the parameter value correction section 220 are functional sections that are mainly involved in calculation of the mouth shape parameter value.

The matching section 212 executes a matching process that accesses the matching server 1400 when the game starts, and exchanges and acquires information (e.g., IP address) about each arcade game device that participates in the game. In this embodiment, each team is formed by four player's characters. One of the teams is formed by player's characters No. 1 to No. 4, and the other team is formed by player's characters No. 5 to No. 8. Therefore, the matching section 212 acquires the IP addresses of the eight arcade game devices, the player information about each player, and the like. The matching section 212 stores the information acquired by the matching process in the storage section 500 as matching data 530.

The sound data processing section 214 generates sound data that is transmitted to another game device from the voice input via the voice input section 110. The sound data processing section 214 temporarily stores sound data 534 received from another game device via the communication section 370 in the storage section 500. The sound data processing section 214 filters and processes the sound data 534, and samples the sound data 534 for calculating the mouth shape parameter value, for example.

The vocal tract cross-sectional area function calculation section 216 calculates the vocal tract cross-sectional area function of the section 52 (see FIG. 6) sampled from the sound data 534 by the sound data processing section 214.

The mouth shape determination section 218 determines the shape of the mouth from the vocal tract cross-sectional area function calculated by the vocal tract cross-sectional area function calculation section 216, and provisionally determines the mouth shape parameter value that implements the determined shape.

The parameter value correction section 220 corrects the mouth shape parameter value that has been provisionally determined by the mouth shape determination section 218 to obtain the final mouth shape parameter value. Specifically, the parameter value correction section 220 optimizes the parameter value to a value within a given range by clipping, or filters the parameter value to suppress an unnatural change of the parameter value, for example. The parameter value correction section 220 detects a silent state contained in the sound data 534, and corrects/optimizes the mouth shape parameter value immediately after the timing when the silent state occurs.

The mouth shape control section 222 controls the shape of the mouth of the avatar 42 based on the determined mouth shape parameter value. In this embodiment, since the avatar 42 is drawn by 3DCG, the mouth shape control section 222 controls the vertices of the polygon that forms the mouth and the internal skeleton model that indicates the area around the mouth and the like. Note that the control target is not limited to the mouth. The mouth shape control section 222 may appropriately control other areas (e.g., cheek and nose) that change in shape when the avatar 42 speaks. An area such as the mouth may be locally controlled by appropriately utilizing known 3DCG modeling technology.

The sound generation section 250 is implemented by a processor such as a digital signal processor (DSP) and its control program. The sound generation section 250 generates sound signals of a game-related effect sound, BGM, an operation sound, and the chat voice sound data 534 based on the processing results of the game calculation section 210, and outputs the generated sound signals to the sound output section 350.

The sound output section 350 is implemented by a device that outputs a sound such as an effect sound or BGM based on the sound signals output from the sound generation section 250. In FIG. 2, the speaker 1324 and the headphone 1374 of the headset 1370 correspond to the sound output section 350.

The image generation section 260 is implemented by a processor such as a GPU or a digital signal processor (DSP), its control program, a drawing frame IC memory such as a frame buffer, and the like. For example, the image generation section 260 generates a game image every frame (1/60th of a second) based on the processing results of the game calculation section 210, and outputs an image signal of the generated game image to the image display section 360.

The image display section 360 displays a game image based on the image signals output from the image generation section 260. The image display section 360 may be implemented by an image display device such as a flat panel display, a cathode-ray tube (CRT), a projector, or a head mount display. In FIG. 2, the video monitor 1322 corresponds to the image display section 360.

The communication control section 270 performs a data communication process, and exchanges data with an external device (another game device in this embodiment) through the communication section 370.

The communication section 370 connects to the communication channel 1 to implement communication. The communication section 370 is implemented by a transceiver, a modem, a terminal adapter (TA), a jack for a communication cable, a control circuit, and the like. In FIG. 2, the communication device 1312 corresponds to the communication section 370.

The storage section 500 stores a system program that causes the processing section 200 to control the arcade game device 1300, a game program and data necessary for causing the processing section 200 to execute the game, and the like. The storage section 500 is used as a work area for the processing section 200, and temporarily stores the results of calculations performed by the processing section 200 based on a program, data input from the operation section 100, and the like. The function of the storage section 500 may be implemented by an IC memory (e.g., RAM or ROM), a magnetic disk (e.g., hard disk), an optical disk (e.g., CD-ROM or DVD), a magnetic card, an IC card, or the like.

In this embodiment, the storage section 500 stores a system program 501 and a game program 502. The processing section 200 reads and executes the game program 502 to implement the function of the game calculation section 210.

In this embodiment, the game program 502 includes a mouth shape parameter value calculation program 504 as middleware. The mouth shape parameter value calculation program 504 includes a sound data processing program 506 that causes the processing section 200 to implement the function of the sound data processing section 214, a vocal tract cross-sectional area function calculation program 508 that causes the processing section 200 to implement the function of the vocal tract cross-sectional area function calculation section 216, and a parameter value correction program 510 that causes the processing section 200 to implement the function of the parameter value correction section 220.

The storage section 500 stores game space setting data 518, character setting data 520, avatar setting data 522, and mouth shape parameter value setting data 524 as data provided in advance. The storage section 500 also stores matching data 530, game state data 532, sound data 534, and volume history data 536 as data that is appropriately generated or rewritten during the game. The storage section 500 also stores a timer value, a parameter, and the like that are appropriately required during the game process.

Various types of data used to form the game space 10 (see FIG. 3) in the virtual three-dimensional space are stored as the game space setting data 518. For example, the game space setting data 518 includes model data and texture data that represent the boundary of the game space 10, the obstacle 12, the bases 14a and 14b, and the like. When a moving obstacle is provided, the game space setting data 518 also includes motion data that indicates the moving obstacle.

The character setting data 520 is provided corresponding to each of the player's characters 20a to 20d and 22a to 22d disposed in the game space 10. The character setting data 520 includes model data, texture data, and motion data that represent each character, and parameter (e.g., hit point) initial setting data.

The avatar setting data 522 includes definition data that indicates the avatar 42. The avatar setting data 522 is provided corresponding to each type of avatar that can be selected by the player.

Figure 12:
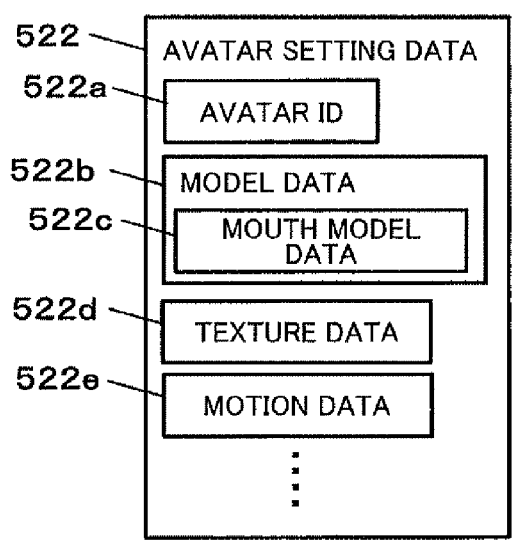
FIG. 12 is a view showing a data configuration example of avatar setting data.

As shown in FIG. 12, the avatar setting data 522 includes an avatar ID 522a, and model data 522b, texture data 522d, and motion data 522e used to form a 3DCG image of the avatar, for example. The model data 522b includes mouth model data 522c that is shape information about an area of the avatar that changes in shape when the avatar speaks. When displaying the avatar 42 as a 2D image, a plurality of images of the mouth may be provided corresponding to each shape instead of the mouth model data 522c so that the image of the mouth can be selectively applied to the face of the avatar 42.

The mouth shape parameter value setting data 524 is provided corresponding to each combination of the sex and the age (child or adult) of the player (speaker), for example. The mouth shape parameter value setting data 524 includes the determination condition used to determine the mouth shape parameter value from the vocal tract cross-sectional area function, various functions, the parameter values provided in advance, and the like.

In this embodiment, a plurality of pieces of mouth shape parameter set value data 524 are provided in advance. Note that the mouth shape parameter set value data 524 may be appropriately changed depending on the qualities of the player, the attribute of the avatar (character), and the like.

Figure 13:
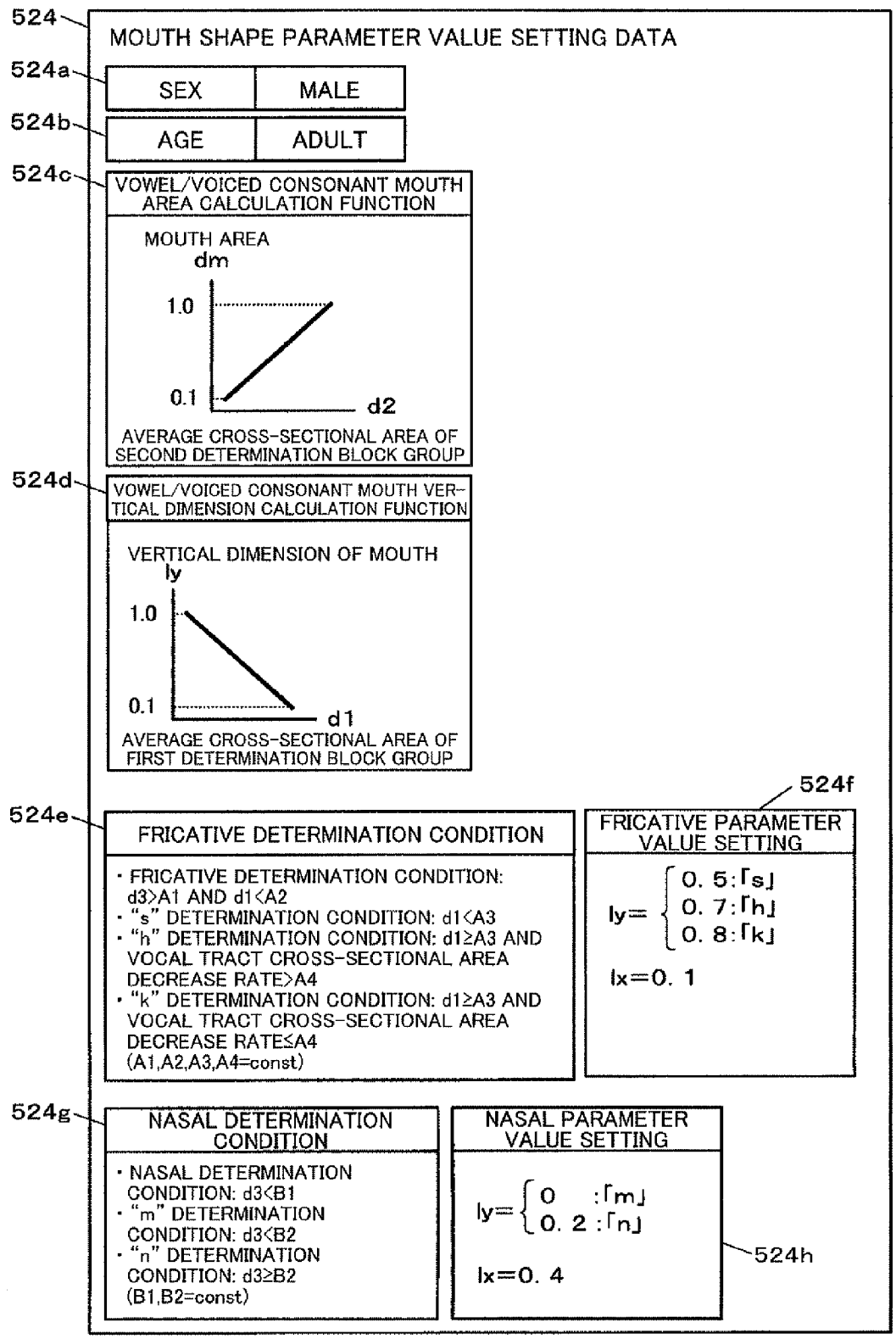
FIG. 13 is a view showing a data configuration example of mouth shape parameter value setting data.

As shown in FIG. 13, the mouth shape parameter value setting data 524 includes a sex 524a and an age 524b as information that indicates the application conditions, for example. The mouth shape parameter value setting data 524 may also include data that indicates an age group, a race, and the like. The mouth shape parameter value setting data 524 includes a vowel/voiced consonant mouth area calculation function 524c and a vowel/voiced consonant mouth vertical dimension calculation function 524d used to determine the vowel/voiced consonant mouth shape parameter value.

The mouth shape parameter value setting data 524 includes a fricative determination condition 524e that stores a condition for determining a fricative and a condition for determining the type of fricative, and a fricative parameter value setting 524f that stores the mouth shape parameter value corresponding to each fricative.

The mouth shape parameter value setting data 524 includes a nasal determination condition 524e that stores a condition for determining a nasal and a condition for determining the type of nasal, and a nasal parameter value setting 524h that stores the mouth shape parameter value corresponding to each nasal.

The matching data 530 is generated by the matching process, and includes information about each player who participates in the game.

As shown in FIG. 14, the matching data 530 includes an IP address 530a of the arcade game device 1300, a character ID 530b operated by the player who uses the arcade game device 1300, an avatar ID 530c, an avatar name 530d, a player's sex 530e, and a player's age 530f. The above information is read from the player information 142 stored in the game card 1332 possessed by the player who uses each arcade game device 1300 determined by the matching process, and distributed by the matching process.

The volume history data 536 stores a change in volume in the section 52 (see FIG. 6) sampled from the sound data 534 in time series.

Operation

The operation of the arcade game device 1300 according to this embodiment is described below.

Figure 15:
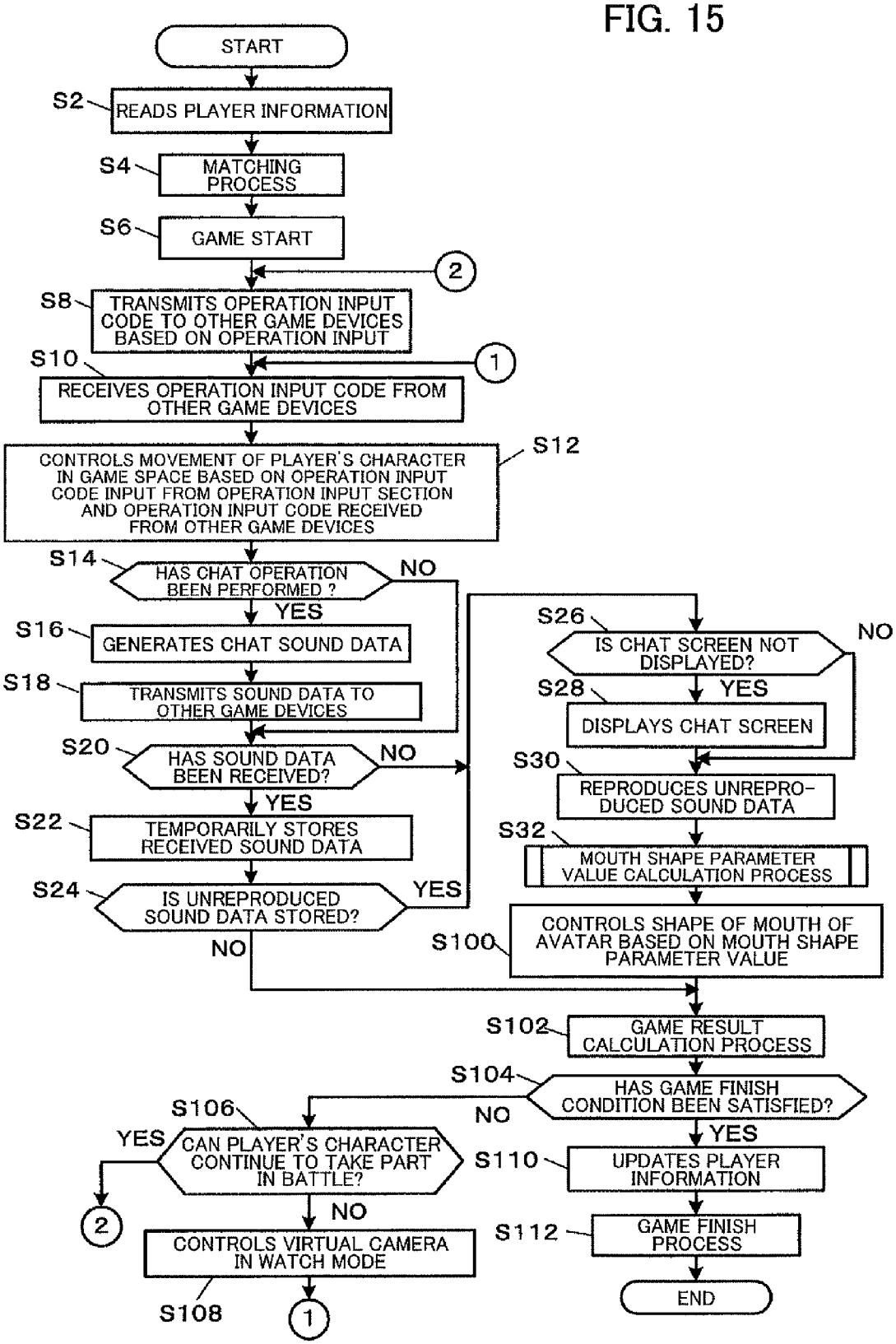
FIG. 15 is a flowchart illustrative of the flow of a process executed by an arcade game device.

FIG. 15 is a flowchart illustrative of the flow of a process executed by each arcade game device 1300 during the online multi-player game. The following process is implemented by causing the processing section 200 to read and execute the system program 501 and the game program 502.

A process that generates and synthesizes an image of the game space 10 photographed by the virtual camera from the first person point of view of the player's character and information displayed within the game screen (e.g., map display section 32) and displays the image on the image display section 360 is automatically performed in a given cycle in the same manner as in a known video game. Therefore, description thereof is omitted. This also applies to a process that generates a game sound (e.g., BGM and ambient sound) and controls the output from the sound output section 350.

The processing section 200 reads the player information 142 stored in the portable information storage medium 140 via the information storage medium reader/writer section 130, and sets the character type of the player's character in the same manner as in a known online multi-player game (step S2). The player information 142 is stored as the information about the player's arcade game device 1300 contained in the matching data 530.

The processing section 200 then executes the matching process (step S4). The matching process may be implemented in the same manner as in a known online multi-player game. In this embodiment, the information about the character type, the avatar ID, the avatar name, the player's sex, and the player's age of each player is exchanged among the arcade game devices 1300 that participate in the game, and stored in the storage section 500 as the matching data 530.

The processing section 200 then forms the game space 10 in the virtual three-dimensional space, disposes the player's characters 20a to 20d and 22a to 22d in the game space 10, initializes the game state data 532, and starts the game (step S6).

When the game has started, the processing section 200 repeatedly executes a process of steps S8 to S108 in a given control cycle (e.g., every ⅙₀th of a second).

Specifically, the processing section 200 transmits the operation input code based on the operation input signal input from the operation input section 100 to other game devices (step S8), and receives the operation input codes transmitted from other game devices (step S10). The processing section 200 controls the movement and the motion (e.g., attack) of each of the player's characters 20a to 20d and 22a to 22d in the game space 10 based on the operation input code based on the operation input signal input from the operation input section 100 and the operation input codes received from other game devices (step S12).

When the processing section 200 has detected that a chat operation has been performed (e.g., a given push switch 1308 has been pressed) using the operation input section 100 (YES in step S14), the processing section 200 generates sound data that indicates the voice of the player input from the voice input section 110 (step S16), and transmits the generated sound data to other game devices (step S18).

When sound data has been received from other game devices (YES in step S20), the processing section 200 temporarily stores the received sound data 534 in the storage section 500 (step S22).

When unreproduced sound data 534 is stored in the storage section 500 (YES in step S24), and the chat screen 40 (see FIG. 4) is not displayed (YES in step S26), the processing section 200 displays the chat screen 40 (step S28). Specifically, the processing section 200 refers to the matching data 530 for the avatar ID 530c that corresponds to the sender of the unreproduced sound data 534, disposes the model of the avatar 42 in the virtual three-dimensional space in an area other than game space 10 based on the avatar setting data 522, renders the front image of the avatar 42 photographed using a sub-virtual camera that differs from the virtual camera used to photograph the game space 10, and displays the avatar 42 at a given position within the game screen. The processing section 200 refers to the matching data 530 for the avatar name 530d that corresponds to the sender of the sound data 534 that is reproduced, and displays a text of the avatar name 530d under the front image of the avatar 42 as the avatar identification information 44.

When the chat screen has been displayed, the processing section 200 reproduces the unreproduced sound data 534 in the current control cycle (step S30), and executes a mouth shape parameter value calculation process (step S32).

Figure 16:
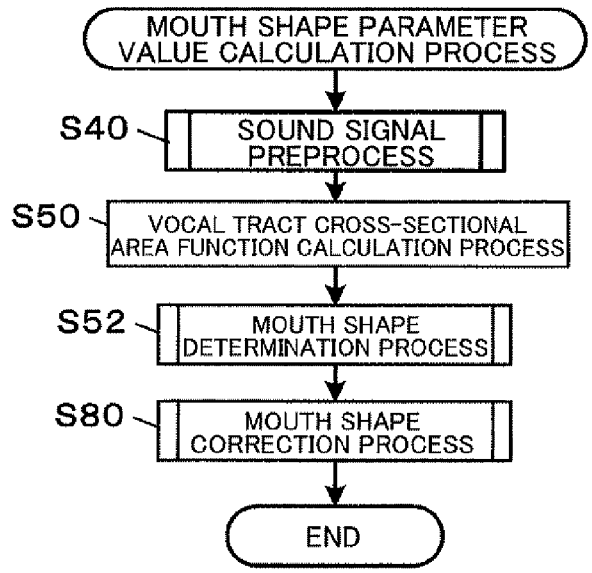
FIG. 16 is a flowchart illustrative of the flow of a mouth shape parameter value calculation process.

FIG. 16 is a flowchart illustrative of the flow of the mouth shape parameter value calculation process according to this embodiment. In the mouth shape parameter value calculation process, the processing section 200 sequentially executes a sound signal preprocess (step S40), a vocal tract cross-sectional area function calculation process (step S50), a mouth shape determination process (step S52), and a mouth shape correction process (step S80).

Figure 17:
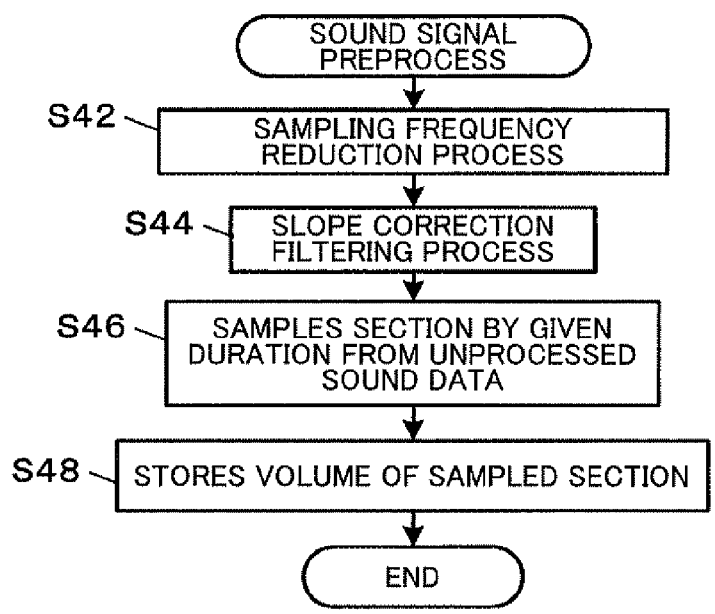
FIG. 17 is a flowchart illustrative of the flow of a sound signal preprocess.

FIG. 17 is a flowchart illustrative of the flow of the sound signal preprocess according to this embodiment. In the sound signal preprocess, the processing section 200 reads the sound data 534, and reduces the sampling frequency to a value sufficient to calculate the vocal tract cross-sectional area function to reduce the subsequent calculation load (step S42). For example, when the sampling frequency of the sound data 534 is almost equal to the CD sampling frequency, the sampling frequency may be almost halved.

The processing section 200 then performs a slope correction filtering process on the calculated vocal tract cross-sectional area function to remove the vocal chord frequency characteristics and the mouth radiation characteristics (step S44). The slope correction filtering process is a known process, and detailed description thereof is omitted. In this embodiment, the correction filtering process is applied by about 6 dB/oct, for example.

The processing section 200 then samples the section 52 (see FIG. 6) by a given duration from the unprocessed sound data 534 that is reproduced in the current control cycle (step S46), calculates the volume of the sampled section, stores the calculated volume as the volume history data 536 in time series (step S48), and finishes the sound signal preprocess.

Figure 18:
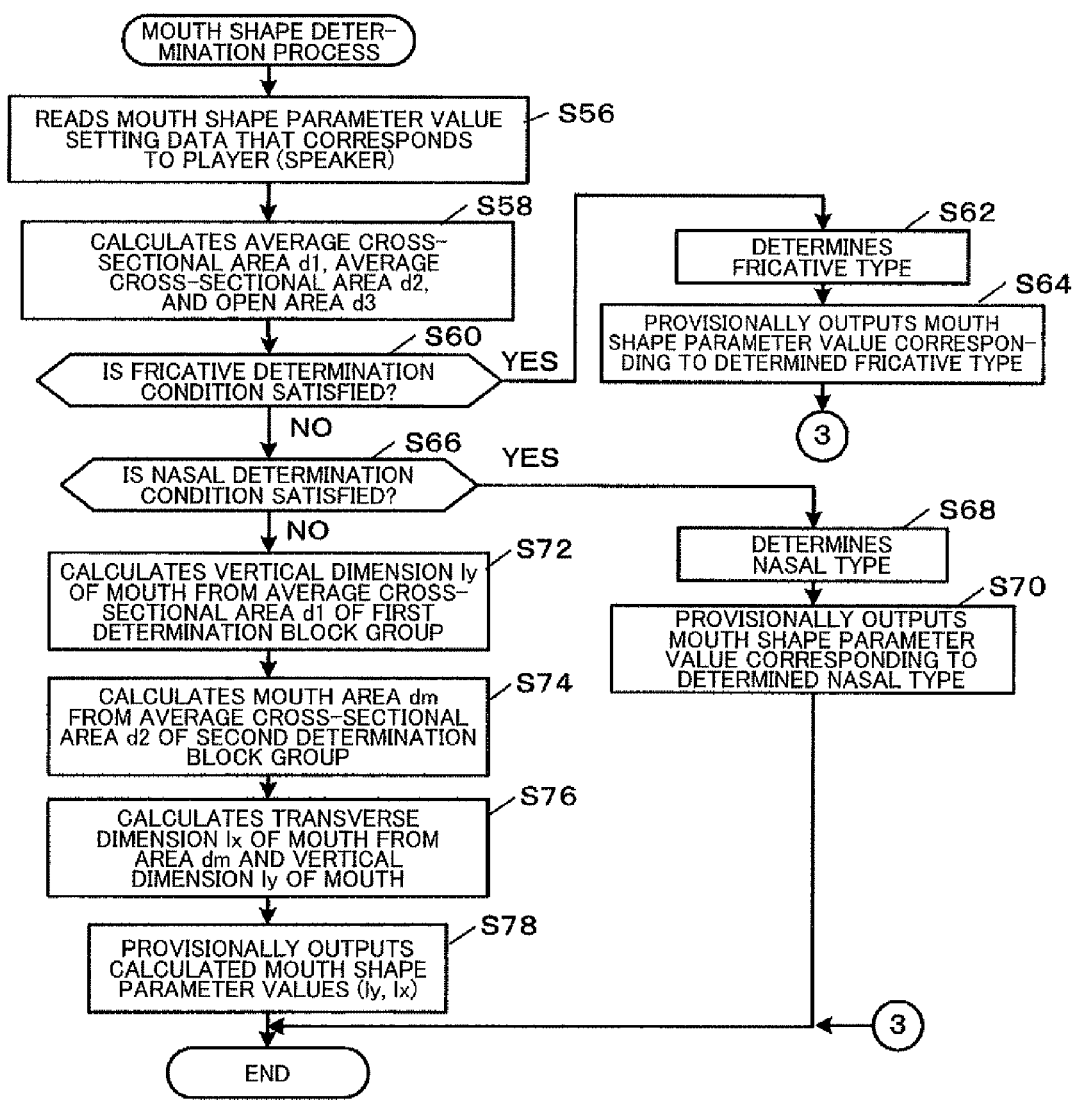
FIG. 18 is a flowchart illustrative of the flow of a mouth shape determination process.

FIG. 18 is a flowchart illustrative of the flow of the mouth shape determination process according to this embodiment. In the mouth shape determination process, the processing section 200 refers to the matching data 530 for the player's sex 530e and the player's age 530f (i.e., the player information corresponding to the sender of the sound data 534 reproduced in the current control cycle), and reads the mouth shape parameter value setting data 524 that corresponds to the player's sex 530e and the player's age 530f (step S56; see FIG. 13).

The processing section 200 then calculates the average cross-sectional area d1 of the first determination block group, the average cross-sectional area d2 of the second determination block group, and the open area d3 of the calculated vocal tract cross-sectional area function according to the mouth shape parameter value setting data 524 (step S58).

When the average cross-sectional area d1, the average cross-sectional area d2, and the open area d3 thus calculated satisfy the fricative determination condition 524e (YES in step S60), the processing section 200 determines the fricative type (step S62), determines the mouth shape parameter value corresponding to the determined fricative type to be a provisional value referring to the fricative parameter value setting 524f (step S64), and finishes the mouth shape determination process.

When the average cross-sectional area d1, the average cross-sectional area d2, and the open area d3 satisfy the nasal determination condition 524g (YES in step S66), the processing section 200 determines the nasal type (step S68), provisionally outputs the mouth shape parameter value corresponding to the determined nasal type to be a provisional value referring to the nasal parameter value setting 524h (step S70), and finishes the mouth shape determination process.

When the average cross-sectional area d1, the average cross-sectional area d2, and the open area d3 do not satisfy the fricative determination condition and the nasal determination condition (NO in step S66), the processing section 200 determines that a vowel/voiced consonant has been produced. The processing section 200 then calculates the vertical dimension 1y of the mouth from the average cross-sectional area d1 based on the vowel/voiced consonant mouth vertical dimension calculation function 524d (step S72), and calculates the area dm of the mouth from the average cross-sectional area d2 based on the vowel/voiced consonant mouth area calculation function 524c (step S74).

The processing section 200 then calculates the transverse dimension 1x of the mouth from the area dm and the vertical dimension 1y of the mouth using a given function (step S76). The processing section 200 determines the vertical dimension 1y and the transverse dimension 1x thus calculated to be provisional values (step S78), and finishes the mouth shape determination process.

Figure 19:
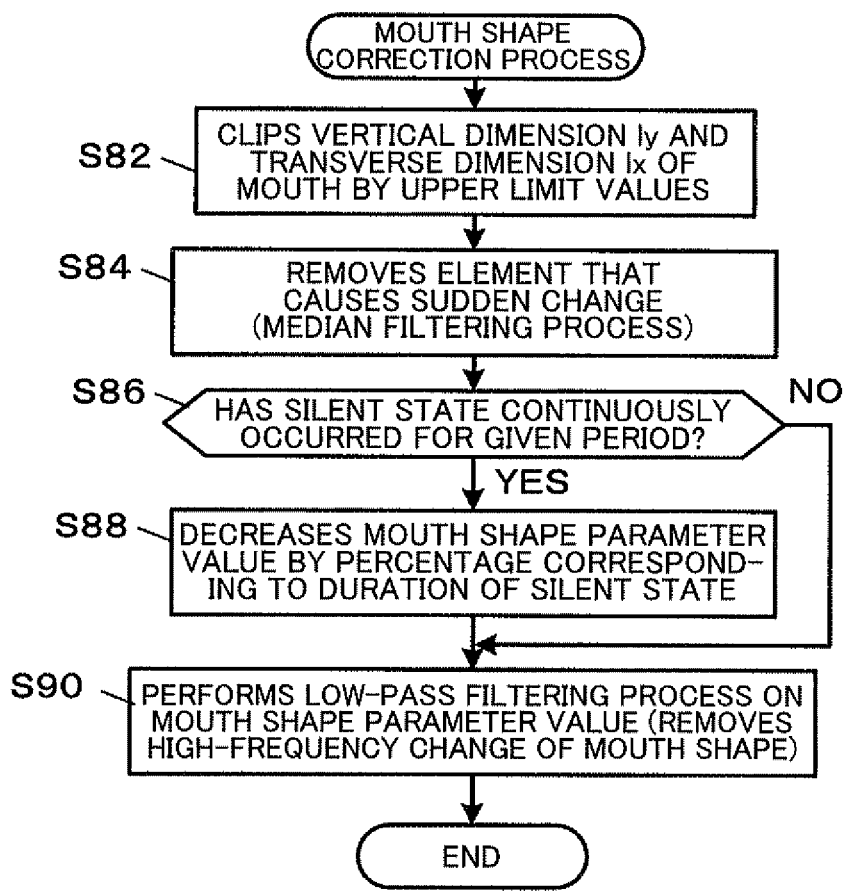
FIG. 19 is a flowchart illustrative of the flow of a mouth shape correction process.

FIG. 19 is a flowchart illustrative of the flow of the mouth shape correction process according to this embodiment. In the mouth shape correction process, the processing section 200 clips the vertical dimension 1y and the transverse dimension 1x of the mouth that have been determined to be the provisional values in the mouth shape determination process by the upper limit values (step S82). This allows the open dimensions of the mouth to be finite.

The processing section 200 then removes an element that causes the vertical dimension 1y and the transverse dimension 1x of the mouth that have been clipped to suddenly change with respect to the values calculated in the preceding control cycle (step S84). Specifically, the processing section 200 applies a median filtering process. Therefore, even if the parameter value differs to a large extent from the preceding value depending on the sampling timing of the section 52, it is possible to correct the parameter value to prevent a situation in which the shape of the mouth of the avatar 42 instantaneously becomes larger or smaller.

The processing section 200 then refers to the volume history data 536, and determines whether or not the volume has not reached the reference value (i.e., a silent state has continuously occurred) within a given period before the current control cycle (step S86). When the volume has not reached the reference value (YES in step S86), the processing section 200 decreases the mouth shape parameter value determined by the mouth shape determination process by a percentage corresponding to the duration of the silent state (step S88). For example, the processing section 200 decreases the mouth shape parameter value by 70% per second, sets the minimum value of the vertical dimension 1y of the mouth to "0", and sets the minimum value of the transverse dimension 1x of the mouth to "0.4".

The processing section 200 then performs a low-pass filtering process on the mouth shape parameter value to suppress an unnatural change of the parameter value to determine the final mouth shape parameter value (step S90), and finishes the mouth shape correction process.

The mouth shape parameter value calculation process according to this embodiment ends upon completion of the mouth shape correction process. As shown in FIG. 15, the processing section 200 then controls the shape of the mouth of the avatar 42 based on the determined mouth shape parameter value so that the mouth of the avatar 42 moves in synchronization with the reproduced sound data (step S100).

The processing section 200 then calculates the game result (step S102). Specifically, the processing section 200 calculates the play time, determines whether or not the player's characters have hit, decrements the hit point when the player's character has been hit, changes the number of remaining bullets, calculates the situation index as the game result calculation process, and updates the game state data 532.

When the calculated game result does not satisfy a given game finish condition (NO in step S104), the processing section 200 determines whether or not the player's character can continue to take part in a battle (step S106).

When the hit point of the player's character has not reached "0", the processing section 200 determines that the player's character can continue to take part in a battle (YES in step S106), and returns to the step S8. When the processing section 200 has determined that the player's character cannot continue to take part in a battle (NO in step S106), the processing section 200 controls the game screen display virtual camera in a given watch mode in the same manner as in a known online multi-player game (step S108), and returns to the step S10.

When the game result satisfies the game finish condition (YES in step S104), the processing section 200 updates the player information 142 stored in the game card 1332 (step S110), executes a given game finish process (step S112), and finishes the online multi-player game process.

According to this embodiment, it is possible to implement natural mouth shape control in synchronization with human voice.

Since the mouth shape parameter value used to control the mouth shape is calculated based on the vocal tract cross-sectional area function, the calculation load can be reduced as compared with a mouth shape control method that determines the type of sound by voice recognition. Therefore, real-time mouth shape control can be implemented even when using a game device that does not have high performance. Since huge voice recognition dictionary data is not required, it is unnecessary to provide a large storage area.

Moreover, sound produced in the mouth depends on the vocal tract cross-sectional area function irrespective of the type of language. Therefore, it is possible to easily deal with a foreign language as compared with a mouth shape control method that determines the type of sound by voice recognition.

Second Embodiment

A second embodiment to which the invention is applied is described below taking an example of a toy that speaks based on the voice of the operator who speaks into a headset. The elements described in connection with the first embodiment are indicated by identical symbols. Description of these elements is omitted.

Figure 20:
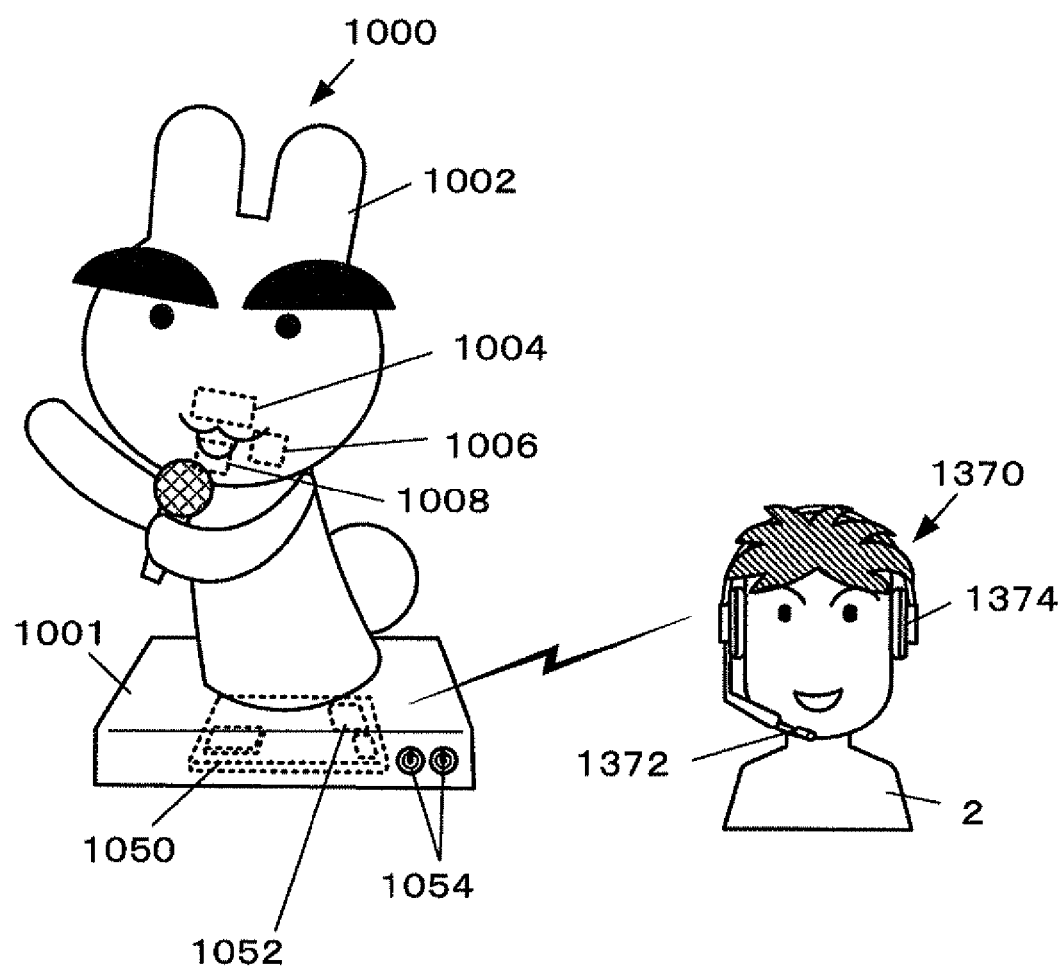
FIG. 20 is a view showing a configuration example of a toy according to a second embodiment.

FIG. 20 is a view showing a configuration example of a toy 1000 (i.e., mouth shape-voice synchronization control device) according to this embodiment. The toy 1000 includes a pedestal 1001, a character 1002 (i.e., three-dimensional model) that is disposed upright on the pedestal 1001, and a headset 1370 that has a short distance wireless communication function. The headset 1370 may not be the accessory of the toy 1000, but may be a general-purpose headset that is separately provided.

The character 1002 is formed in the shape of a stuffed toy that is produced by covering a plastic skeleton with cloth, for example. An electronically controlled vertical actuator 1004 that opens and closes the mouth of the character 1002 in the vertical direction, an electronically controlled transverse actuator 1006 that opens and closes the mouth of the character 1002 in the transverse direction, and a speaker 1008 are provided inside the mouth of the character 1002.

The pedestal 1001 includes a control unit 1050 that electronically controls each section (including the vertical actuator 1004 and the transverse actuator 1006) of the toy 1000, and an operator setting dial 1054 that is used to set operator information (e.g., the sex and the age (adult/child) of the operator 2) (corresponding to similar parameters contained in the player information according to the first embodiment).

The control unit 1050 corresponds to the control unit 1310 according to the first embodiment. The control unit 1050 includes a short distance wireless communication chip 1052 that communicates with the headset 1370 having a short distance wireless communication function, and receives a sound signal of voice collected by a microphone 1372 included in the headset 1370.

The control unit 1050 reproduces the sound signal of the voice of the operator 2, which was received from the headset 1370, from the speaker 1008 as the voice of the character 1002, and calculates the mouth shape parameter value based on the sound data 534 of the voice of the operator 2. The control unit 1050 controls the vertical actuator 1004 and the transverse actuator 1006 based on the calculated mouth shape parameter value to control the shape of the mouth of the character 1002 as if the character 1002 spoke the reproduced voice.

Figure 21:
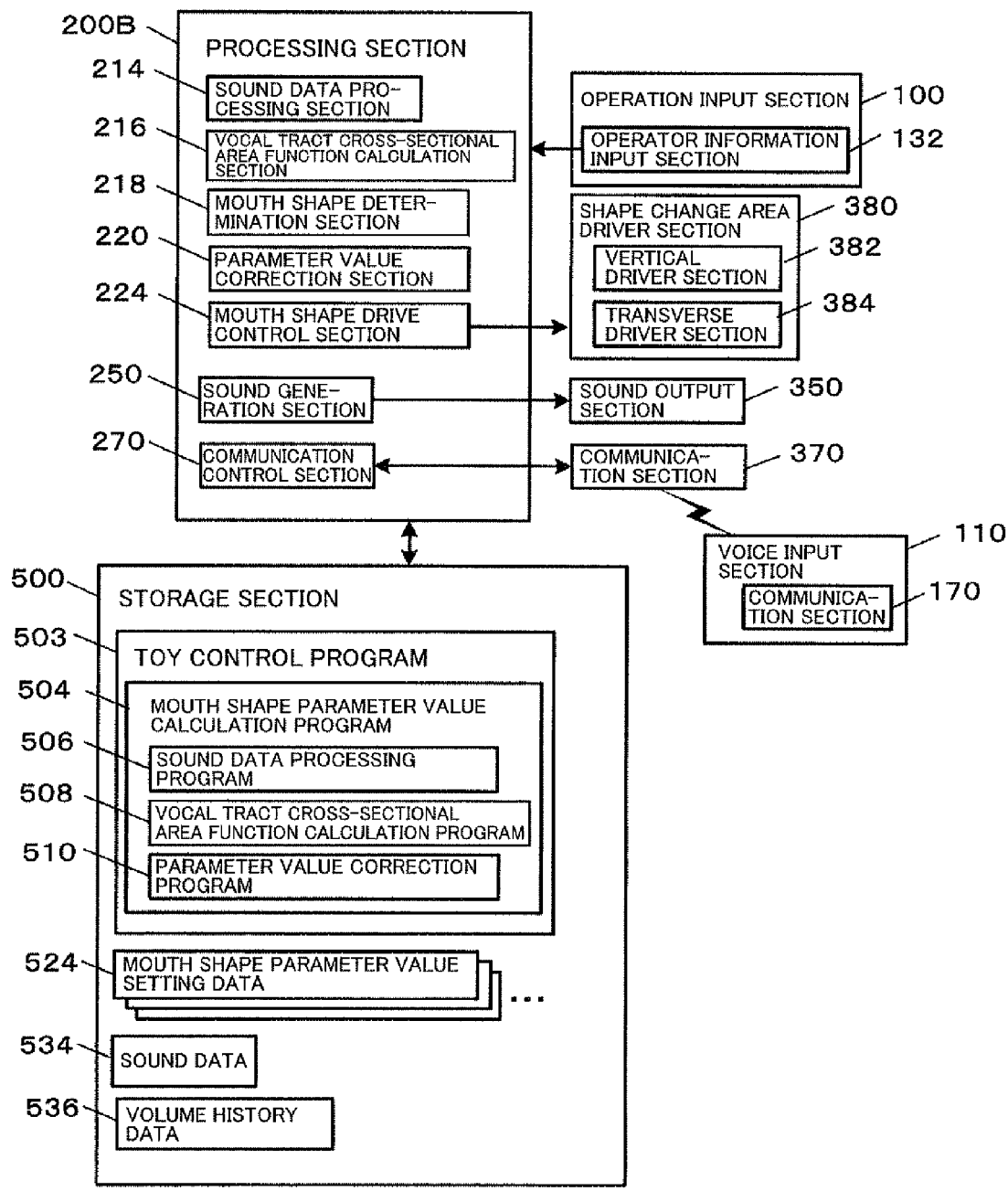
FIG. 21 is a functional block diagram showing a functional configuration example according to the second embodiment.

FIG. 21 is a functional block diagram showing a functional configuration example according to this embodiment.

In this embodiment, the operation input section 100 includes an operator information input section 132. The operator setting dial 1054 shown in FIG. 20 corresponds to the operator information input section 132. Note that the operator information input section 132 may be implemented by the portable information storage medium 140 and the information storage medium reader/writer section 130 in the same manner as in the first embodiment. In this case, the information storage medium reader/writer section 130 reads the operator information stored in the portable information storage medium 140.

The voice input section 110 into which the operator 2 inputs voice includes a communication section 170 configured in the same manner as the communication section 370, and transmits the collected sound data to the communication section 370. In FIG. 20, the headset 1370 having a short distance wireless communication function corresponds to the voice input section 110.

A processing section 200B according to this embodiment corresponds to the processing section 200 according to the first embodiment. The processing section 200B reads a toy control program 503 stored in the storage section 500, and performs a calculation process based on the toy control program 503 to electronically control the entire toy 1000.

The processing section 200B includes the sound data processing section 214, the vocal tract cross-sectional area function calculation section 216, the mouth shape determination section 218, the parameter value correction section 220, the sound generation section 250, and the communication control section 270 in the same manner as the processing section 200 according to the first embodiment. However, the processing section 200B does not include the image generation section 260, and includes a mouth shape drive control section 224 instead of the mouth shape control section 222 according to the first embodiment.

The mouth shape drive control section 224 performs a calculation process for controlling the shape of the mouth of the character 1002, generates a drive control signal, and outputs the generated drive control signal to a shape change area driver section 380.

The shape change area driver section 380 is implemented by an actuator, and physically changes the shape of an area of the character 1002 that changes in shape when the character 1002 speaks.

In this embodiment, the degree of opening of the mouth of the character 1002 is determined by vertical and transverse dimensions in the same manner as in the first embodiment. Therefore, the shape change area driver section 380 includes a vertical driver section 382 that implements an arbitrary degree of opening of the mouth of the character 1002 in the vertical direction, and a transverse driver section 384 that implements an arbitrary degree of opening of the mouth of the character 1002 in the transverse direction. The vertical actuator 1004 and the transverse actuator 1006 shown in FIG. 20 respectively correspond to the vertical driver section 382 and the transverse driver section 384.

Figure 22:
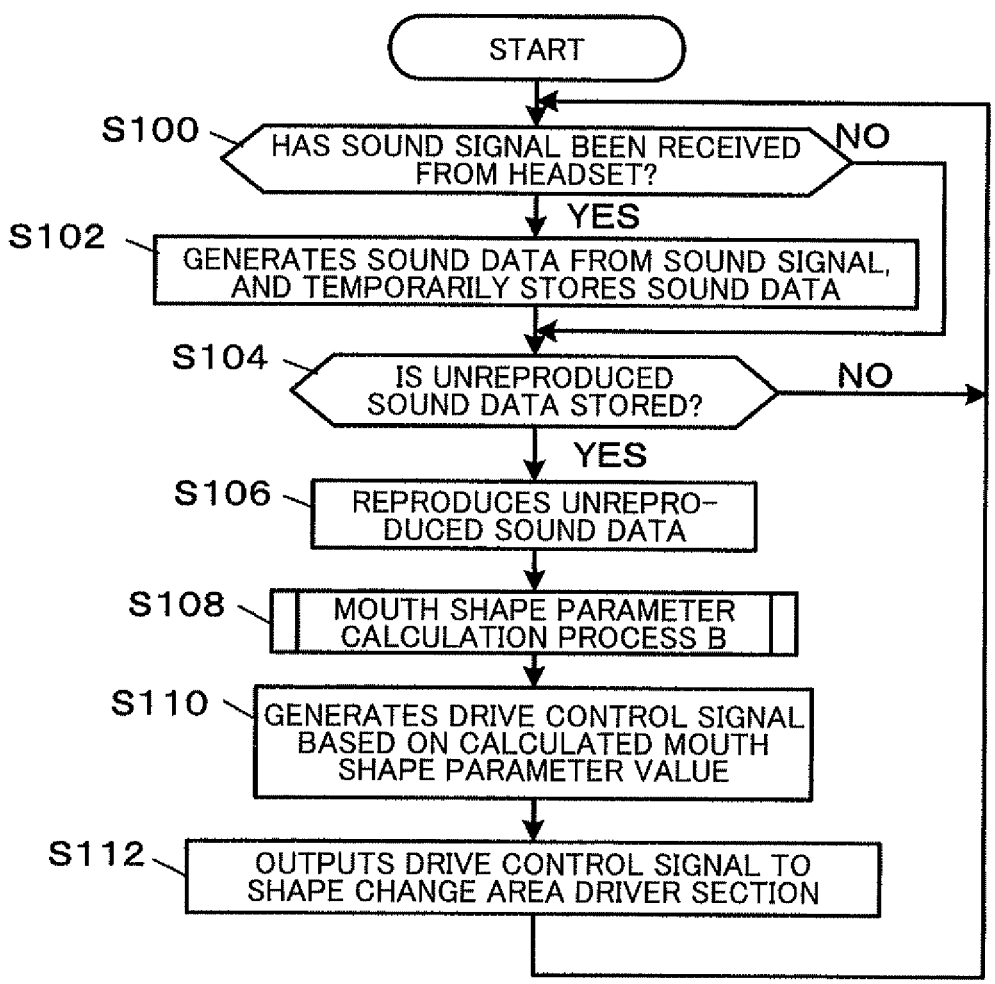
FIG. 22 is a flowchart illustrative of the flow of a process according to the second embodiment.

An operation according to this embodiment is described below. FIG. 22 is a flowchart illustrative of the flow of a process according to this embodiment. The following process is implemented by causing the processing section 200B to read the toy control program 503 from the storage section 500 and perform a calculation process.

When the sound signal of the voice of the operator 2 has been received from the headset 1370 (YES in step S100), the processing section 200B generates the sound data 534 from the received sound signal, and temporarily stores the sound data 534 in the storage section 500 (step S102). When unreproduced sound data 534 is stored in the storage section 500 (YES in step S104), the processing section 200B reproduces the unreproduced sound data 534 (step S106), and executes a mouth shape parameter value calculation process B (step S108).

Figure 23:
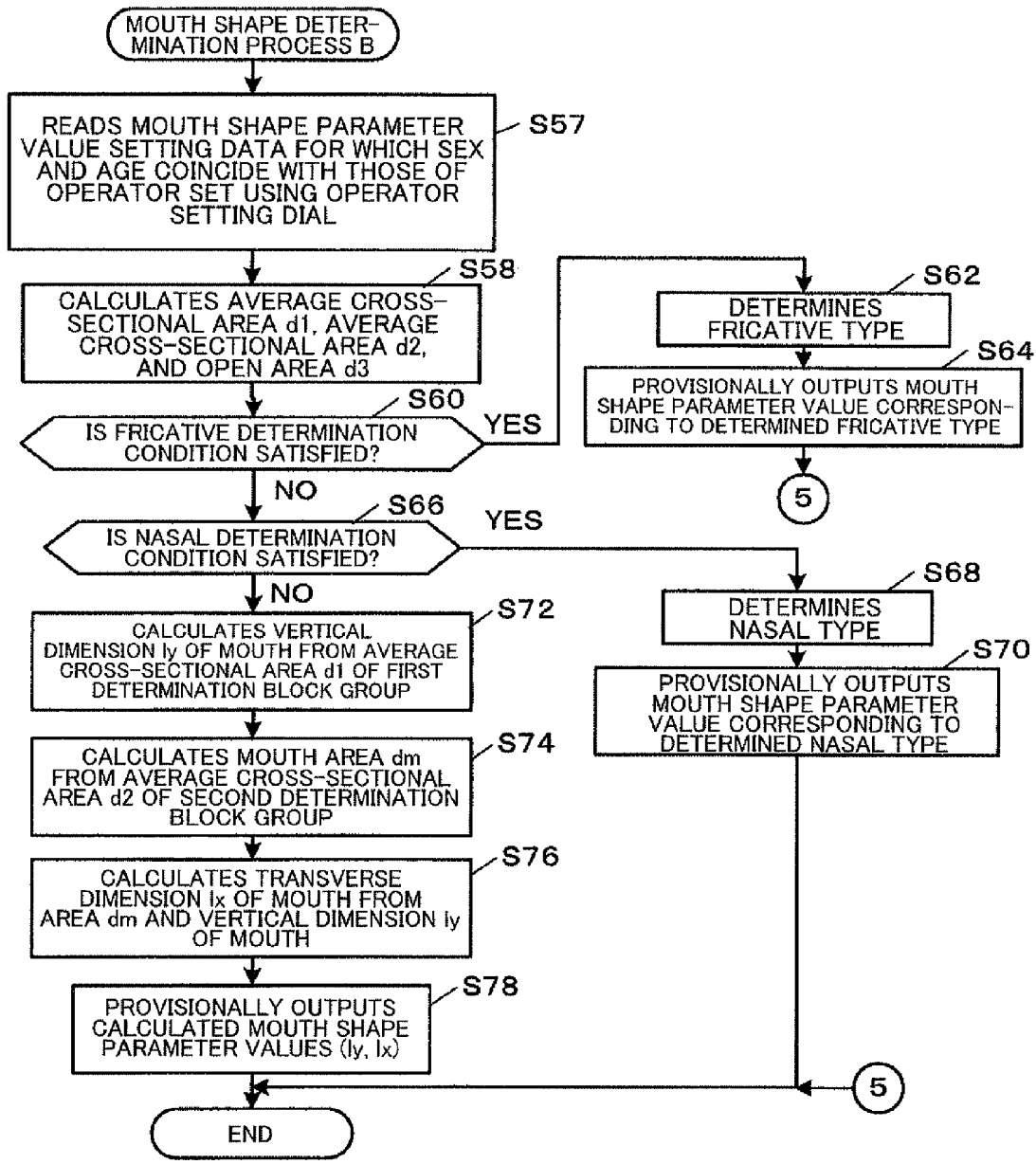
FIG. 23 is a flowchart illustrative of the flow of a mouth shape determination process B according to the second embodiment.

The mouth shape parameter value calculation process B is basically the same as the mouth shape parameter value calculation process according to the first embodiment, but differs from the mouth shape parameter value calculation process according to the first embodiment as to the mouth shape determination process. FIG. 23 is a flowchart illustrative of the flow of a mouth shape determination process B according to this embodiment. The mouth shape determination process B is basically the same as the mouth shape determination process according to the first embodiment, but the step S56 according to the first embodiment is replaced by a step S57.

Specifically, the processing section 200B reads the mouth shape parameter value setting data 524, for which the sex 524a and the age 524b coincide with the sex and the age of the operator set using the operator setting dial 1054, from the storage section 500 (step S57; see FIG. 13), and provisionally sets the mouth shape parameter value based on the mouth shape parameter value setting data 524 read from the storage section 500 (steps S58 to S78).

The processing section 200B corrects the mouth shape parameter value provisionally set by the mouth shape determination process B by executing the mouth shape correction process in the same manner as in the first embodiment (step S80; see FIG. 16) to determine the final mouth shape parameter value, and finishes the mouth shape parameter value calculation process B.

Again referring to FIG. 22, the processing section 200B generates the drive control signal supplied to the shape change area driver section 380 based on the calculated mouth shape parameter value (step S110), and outputs the generated drive control signal (step S112).

According to this embodiment, it is possible to implement a talking toy that operates as if to speak the voice of the operator 2. Since the shape of the mouth of the toy accurately reproduces the shape of a human mouth, the toy can operate as if to actually speak as compared with a toy that merely opens and closes its mouth (i.e., lip synchronization).

Modifications

The first and second embodiments to which the invention is applied have been described above. Note that the invention is not limited thereto. Various modifications may be appropriately made, such as changing some of the elements, adding other elements, or omitting some of the elements.

For example, the above embodiments utilize the arcade game device 1300. Note that a consumer game device or a portable game device that has a network communication function (particularly a device that can implement an online multi-player game), a personal computer, a portable telephone, or the like may be used instead of the arcade game device 1300.

The above embodiments have been described taking an example in which the mouth of the character (avatar) changes in shape when the character (avatar) speaks. Note that the shape of an area other than the mouth may be controlled depending on the character that speaks in place of the player or the operator.

Figure 24:
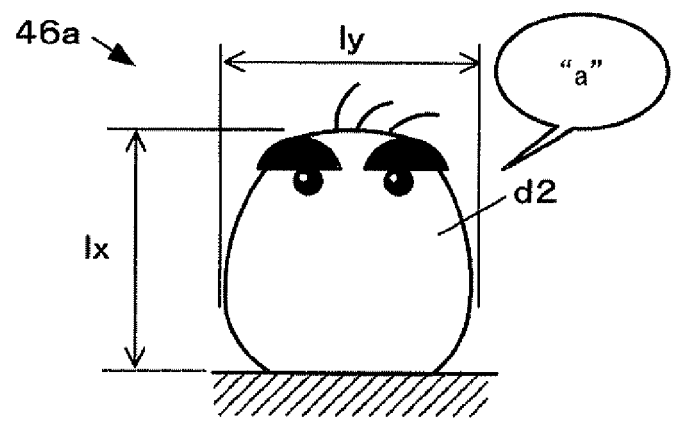
FIG. 24 is a view showing a modification of a shape change area controlled based on a mouth shape parameter value.
Figure 24:
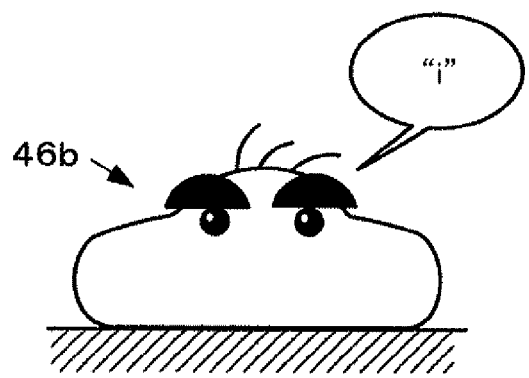
Figure 24:
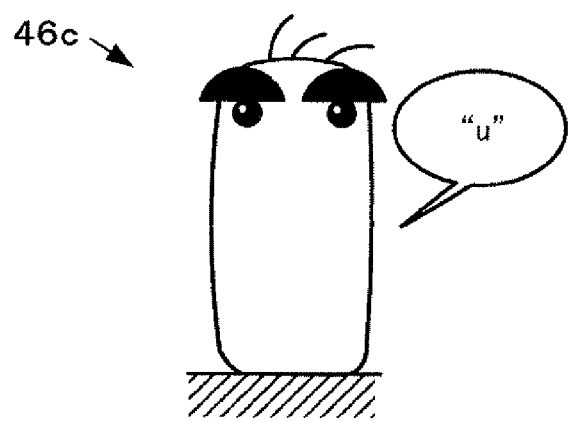

As shown in FIG. 24, when an avatar 46 (46a, 46b, 46c) has a jelly-like body that undergoes elastic deformation and speaks while changing in size or shape in synchronization with the voice, the ratio of the vertical dimension to the transverse dimension or the frontal projection area may be changed based on the vertical dimension 1y and the transverse dimension 1x of the mouth.

The above embodiments have been described taking an example in which the player or the operator has a conversation with another player or operator. Note that the invention may also be applied to a scream such as "Zowie!" or "Wow!".

The mouth shape parameter value calculation program 504 (see FIG. 10) and the mouth shape parameter value setting data 524 may be utilized as mouth shape control middleware in CG image (video) production.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A method of controlling a mouth shape of an animated character on a display that is implemented by a processor, the method comprising:

estimating by the processor the shape of a vocal tract of a speaker during speaking by analyzing sound data of the speaker's voice and estimating the shape based on (i) an open area of the vocal tract, (ii) a cross-sectional area within a given mouth-side range of the vocal tract, and (iii) a cross-sectional area within a given throat-side range of the vocal tract that is closer to a throat side of the vocal tract than the given mouth-side range; and controlling using the processor, the mouth shape of the animated character using the estimated shape of the vocal tract, including controlling a vertical dimension of the mouth of the character based on the cross-sectional area within the given throat-side range and controlling a size of the mouth of the animated character based on the cross-sectional area within the given mouth-side range;

displaying the animated character, using the display;

controlling the output voice of the animated character based on the sound data; and controlling the mouth shape of the character in synchronization with the output voice.

2. The method as defined in claim 1, wherein
the estimating of the shape of the vocal tract includes analyzing the sound data to calculate the shape of a vocal tract model, the vocal tract model having a plurality of cross-sectional areas including the open area, the cross-sectional area within the given mouth-side range, and the cross-sectional area within the given throat-side range.

3. The method as defined in claim 1, further comprising:
controlling output of voice based on the sound data; and
controlling the mouth shape of the character in synchronization with the output voice.

4. The method as defined in claim 1, wherein
the controlling of the mouth shape of the character includes decreasing the vertical dimension as the cross-sectional area within the given throat-side range increases.

5. The method as defined in claim 1, further comprising:
detecting whether or not the sound data indicates sound that corresponds to a fricative, wherein
the controlling of the mouth shape of the character includes decreasing a size of the mouth of the character when sound that corresponds to a fricative has been detected as compared with the size of the mouth of the character when sound that corresponds to a fricative has not been detected.

6. The method as defined in claim 1, further comprising:
detecting whether or not the sound data indicates sound that corresponds to a fricative; and
determining a fricative type when sound that corresponds to a fricative has been detected, wherein
the controlling of the mouth shape of the character includes controlling the mouth shape based on the determined fricative type.

7. The method as defined in claim 1, further comprising:
detecting whether or not the sound data indicates sound that corresponds to a nasal, wherein
the controlling of the mouth shape of the character includes decreasing a size of the mouth of the character when sound that corresponds to a nasal has been detected as compared with the size of the mouth of the character when sound that corresponds to a nasal has not been detected.

8. The method as defined in claim 1, further comprising:
detecting whether or not the sound data indicates sound that corresponds to a nasal; and
determining a nasal type when sound that corresponds to a nasal has been detected, wherein
the controlling of the mouth shape of the character includes controlling the mouth shape based on the determined nasal type.

9. The method as defined in claim 1, further comprising:
detecting whether or not the sound data indicates a silent state, wherein
the controlling of the mouth shape of the character includes gradually decreasing a size of the mouth of the character with time as a duration of the silent state increases.

10. The method as defined in claim 1, wherein
the controlling of the mouth shape of the character includes suppressing a sudden change of the mouth shape so that the mouth shape gradually changes.

11. A mouth shape control device comprising:
a vocal tract shape calculation section that estimates the shape of a vocal tract of a speaker during speaking by analyzing sound data of the speaker's voice and estimating the shape based on (i) an open area of the vocal tract, (ii) a cross-sectional area within a given mouth-side range of the vocal tract, and (iii) a cross-sectional area within a given throat-side range of the vocal tract that is closer to a throat side of the vocal tract than the given mouth-side range; and
a mouth shape control section that controls the mouth shape of a character using the shape of the vocal tract estimated by the vocal tract shape calculation section, including i) controlling a vertical dimension of the mouth of the character based on the cross-sectional area within the given throat-side range; ii) controlling a size of the mouth of the character based on the cross-sectional area within the given mouth-side range; iii) controlling the output voice of the character based on the sound data; and iv) controlling the mouth shape of the character in synchronization with the output voice.

* * * * *